(12) United States Patent
Byrne et al.

(10) Patent No.: US 7,653,783 B2
(45) Date of Patent: Jan. 26, 2010

(54) PING-PONG STATE MACHINE FOR STORAGE-DEVICE ARRAY

(75) Inventors: Richard J. Byrne, Hillsborough, NJ (US); Eu Gene Goh, Singapore (SG); Silvester Tjandra, Singapore (SG)

(73) Assignee: Agere Systems Inc., Allentown, PA (US)

( * ) Notice: Subject to any disclaimer, the term of this patent is extended or adjusted under 35 U.S.C. 154(b) by 259 days.

(21) Appl. No.: 11/544,456

(22) Filed: Oct. 6, 2006

(65) Prior Publication Data

US 2007/0180297 A1 Aug. 2, 2007

Related U.S. Application Data

(60) Provisional application No. 60/724,573, filed on Oct. 7, 2005.

(51) Int. Cl.
G06F 12/00 (2006.01)
G06F 11/00 (2006.01)
G06F 3/00 (2006.01)

(52) U.S. Cl. .............................. 711/114; 710/52; 714/6; 711/E12.035; 711/E12.082

(58) Field of Classification Search .................. 711/114
See application file for complete search history.

(56) References Cited

U.S. PATENT DOCUMENTS

| 4,864,531 | A | 9/1989 | Quatse et al. .................. 714/52 |
| 5,373,512 | A | 12/1994 | Brady ......................... 714/767 |
| 5,805,788 | A | 9/1998 | Johnson ......................... 714/6 |
| 5,826,001 | A | 10/1998 | Lubbers et al. ................. 714/6 |
| 5,960,169 | A | 9/1999 | Styczinski ..................... 714/6 |
| 6,457,109 | B1 | 9/2002 | Milillo et al. ................ 711/162 |
| 6,571,351 | B1 * | 5/2003 | Mitaru et al. ................... 714/6 |
| 6,651,154 | B1 | 11/2003 | Burton et al. ............... 711/202 |
| 6,839,827 | B1 | 1/2005 | Beardsley et al. ........... 711/206 |
| 6,842,422 | B1 | 1/2005 | Bianchini .................... 370/216 |
| 2001/0002480 | A1 | 5/2001 | Dekoning et al. ........... 711/130 |
| 2002/0095532 | A1 | 7/2002 | Surugucchi et al. ............ 710/5 |
| 2003/0056142 | A1 | 3/2003 | Hashemi ........................ 714/6 |
| 2003/0131191 | A1 * | 7/2003 | Zhang et al. ................. 711/113 |
| 2004/0049632 | A1 | 3/2004 | Chang et al. ................. 711/114 |
| 2004/0153717 | A1 | 8/2004 | Duncan ......................... 714/5 |

(Continued)

Primary Examiner—Reginald G Bragdon
Assistant Examiner—Aracelis Ruiz
(74) Attorney, Agent, or Firm—Mendelsohn, Drucker & Associates, P.C.; Kevin M. Drucker; Steve Mendelsohn

(57) ABSTRACT

In one embodiment, an apparatus for reading from a physical storage-device array including a plurality of storage devices. The physical storage-device array has a plurality of sector levels, each sector level containing one sector on each storage device in the array at corresponding addresses on across the storage devices. The apparatus includes: (1) a memory adapted to store two or more profiles, each profile defining (i) a virtual array associated with a selected set of the storage devices and (ii) one or more parameters used for accessing information from the virtual array; (2) a buffer (i) having a first portion and a second portion and (ii) coupled to receive data from the storage devices; and (3) a state machine (i) coupled to the buffer and the memory and (ii) adapted to generate two or more successive pairs of instructions. The first instruction of each pair of instructions (i) is based on one or more parameters of a first profile and (ii) is an instruction to read, into the first portion of the buffer, one sector of data from each storage device of a first virtual array; and the second instruction of each pair of instructions (i) is based on one or more parameters of a second profile and (ii) is an instruction to read, into the second portion of the buffer, one sector of data from each storage device of a second virtual array.

29 Claims, 23 Drawing Sheets

FIG. 8

ROTATING PARITY-PLACEMENT STRIPING SCHEME

| DRIVE | disk0 | disk1 | disk2 | disk3 | disk4 |  |
|---|---|---|---|---|---|---|
| | a | b | c | d | P0 | STRIPE 0 |
| | e | f | g | P1 | h | STRIPE 1 |
| | i | j | P2 | k | l | STRIPE 2 |
| | m | P3 | n | o | p | STRIPE 3 |
| | P4 | q | r | s | t | STRIPE 4 |
| | u | v | w | x | P5 | STRIPE 5 |

FIG. 9

DSA DATA-SECTOR ADDRESSING SCHEME

| disk0 | disk1 | disk2 | disk3 | disk4 | |
|---|---|---|---|---|---|
| 0 | 1 | 2 | 3 | P0 | |
| 4 | 5 | 6 | 7 | P1 | STRIPE 0 |
| 8 | 9 | 10 | 11 | P2 | |
| 12 | 13 | 14 | 15 | P3 | |
| 16 | 17 | 18 | P4 | 19 | |
| 20 | 21 | 22 | P5 | 23 | STRIPE 1 |
| 24 | 25 | 26 | P6 | 27 | |
| 28 | 29 | 30 | P7 | 31 | |
| 32 | 33 | P8 | 34 | 35 | |
| 36 | 37 | P9 | 38 | 39 | STRIPE 2 |
| 40 | 41 | P10 | 42 | 43 | |
| 44 | 45 | P11 | 46 | 47 | |
| 48 | P12 | 49 | 50 | 51 | |
| 52 | P13 | 53 | 54 | 55 | STRIPE 3 |
| 56 | P14 | 57 | 58 | 59 | |
| 60 | P15 | 61 | 62 | 63 | |
| P16 | 64 | 65 | 66 | 67 | |
| P17 | 68 | 69 | 70 | 71 | STRIPE 4 |
| P18 | 72 | 73 | 74 | 75 | |
| P19 | 76 | 77 | 78 | 79 | |
| 80 | 81 | 82 | 83 | P20 | |
| 84 | 85 | 86 | 87 | P21 | STRIPE 5 |

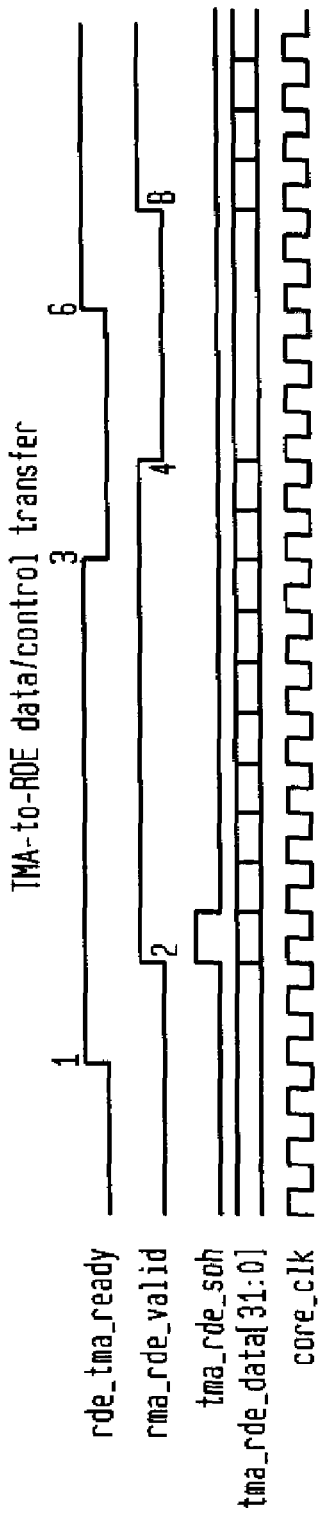
FIG. 11 TMA-to-RDE data/control transfer
FIG. 12 tma_rde_data[31:0] Storage-Request Frame Format
| WORD | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | T | | | QID[6:0] | | | | | RAC[3:0] | | | | LENGTH[15:0] | | | | | | | | | | | | | | | DSA[35:32] | | | | |
| 1 | DSA[31:0] | | | | | | | | | | | | | | | | | | | | | | | | | | | | | | | |
| 2 TO (LENGTH *128)+1 | DATA | | | | | | | | | | | | | | | | | | | | | | | | | | | | | | | | tma_rde_data[31:0] Retrieval-Request Frame Format

| WORD | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | T | | QID[6:0] | | | | | | RAC[3:0] | | | | LENGTH[15:0] | | | | | | | | | | | | | | | | DSA[35:32] | | | |
| 1 | DSA[31:0] | | | | | | | | | | | | | | | | | | | | | | | | | | | | | | | |

RDE-to-TMA data/control transfer

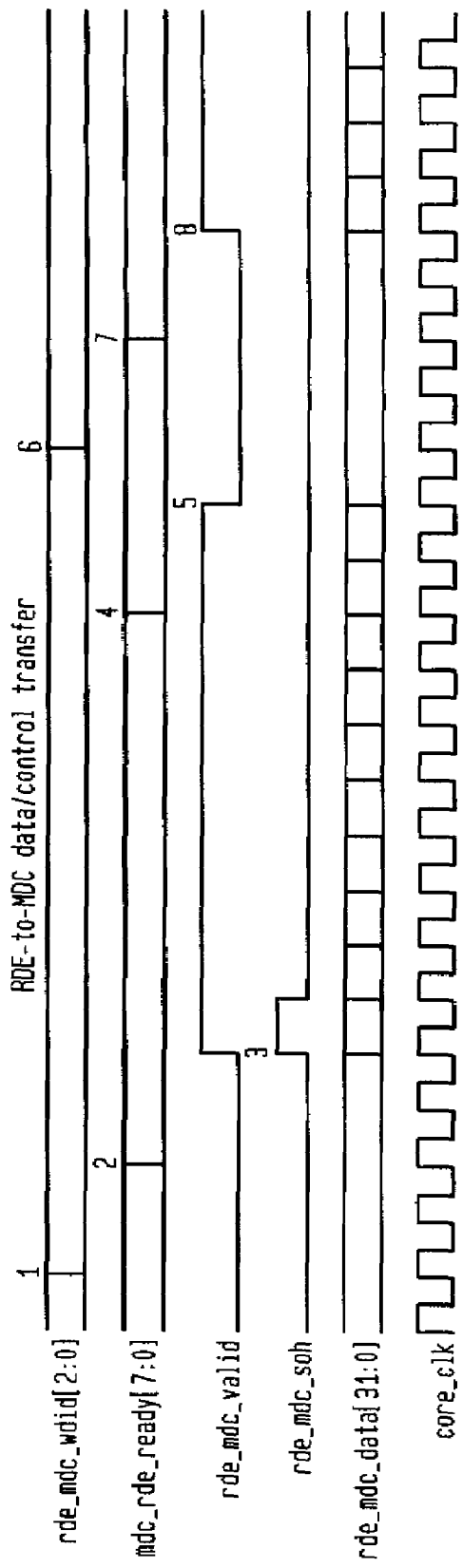

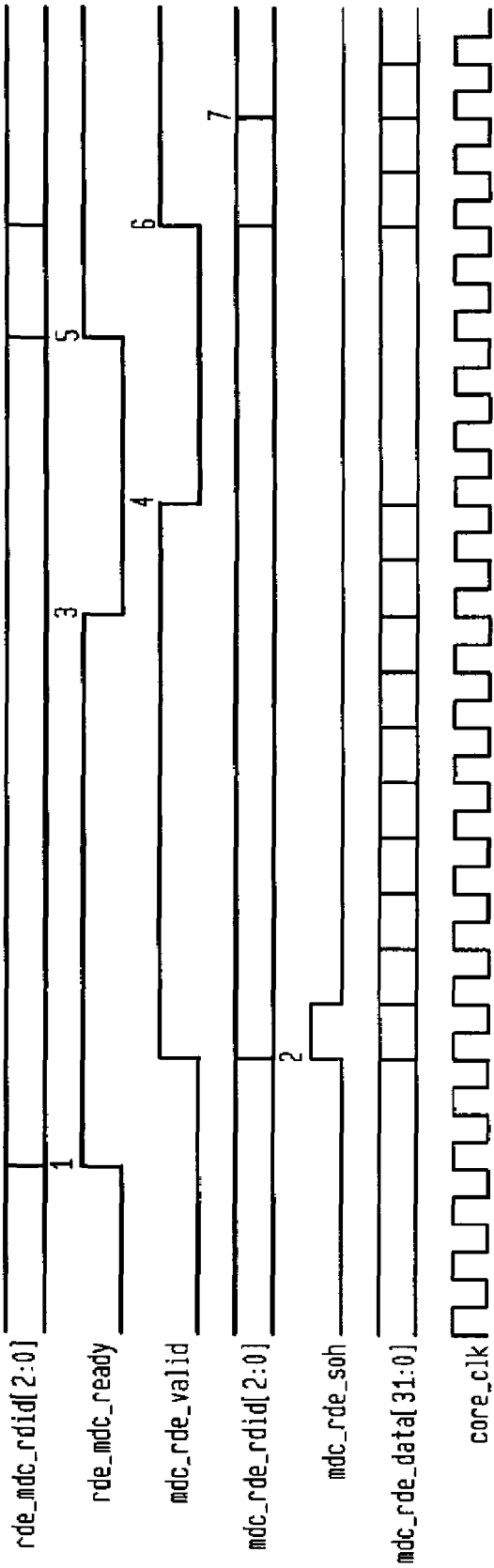

FIG. 19 mdc_rde_data[31:0] Retrieval-Response Frame Format

| WORD | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | T | | QID[6:0] | | | | | | E | | | | | | | | RESERVED | | | | | | | | | | | | | | | |
| 1 TO XCNT*128 | DATA | | | | | | | | | | | | | | | | | | | | | | | | | | | | | | | |

FIG. 20 mdc_rde_data[31:0] Storage-Response Frame Format

| WORD | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | T | | QID[6:0] | | | | | | E | | | | | | | | RESERVED | | | | | | | | | | | | | | | |

WRITE OPERATION STATE MACHINE (WOSM)
STATE DIAGRAM

FIG. 28 Issued-Request FIFO (IRF) Frame Format

PING-PONG STATE MACHINE FOR STORAGE-DEVICE ARRAY

CROSS-REFERENCE TO RELATED APPLICATIONS

This application claims the benefit of the filing date of U.S. provisional application No. 60/724,573, filed on Oct. 7, 2005, the teachings of which are incorporated herein by reference.

This application is one of a set of U.S. patent applications consisting of Ser. No. 11/544,442 filed as Ser. No. 11/544,462 filed as Ser. No. 11/544,445 filed as and Ser. No. 11/544,456, all of which were filed on the same date and the teachings of all of which are incorporated herein by reference.

BACKGROUND OF THE INVENTION

1. Field of the Invention

The present invention relates to data storage devices, and, in particular, to arrays of disks for storing data.

2. Description of the Related Art

In general, there are several defined categories of storage schemes that are used in conjunction with a Redundant Array of Independent (or Inexpensive) Disks (RAID). Different hardware and software components supplied by different vendors may support one or more of these schemes, which are identified as RAID "levels" having particular specifications, as follows.

RAID level 0 (or "RAID-0") specifies a block-interleaved, striped disk array without fault tolerance and requires a minimum of two drives to implement. In a RAID-0 striped disk arran, the data broken down into blocks, and each block is written to a separate disk drive in the array. Input/output (I/O) performance is greatly improved by spreading the I/O load across a plurality of channels and drives. In RAID-0, optimal performance is achieved when data is striped across multiple controllers with only one drive per controller. RAID-0 involves no parity calculation overhead and is not a "true" RAID because it is not fault-tolerant, i.e., there is no redundancy of data. Thus, the failure of only one drive will result in all of the data in an array being lost. FIG. 1 illustrates the sequence of storing blocks in an exemplary RAID-0 striped disk array, wherein block A is written to the first disk, block B is written to the second disk, block C is written to the third disk, block D is written to the first disk, and so forth.

RAID-1 specifies a disk array with mirroring (redundancy) of data across different physical hard disks. In a RAID-1 array, each block of data on a disk exists in identical form on another disk in the array. For optimal performance, the controller performs two concurrent separate reads per mirrored disk pair and two duplicate writes per mirrored disk pair. RAID-1 requires a minimum of two drives to implement and makes data recovery following a disk failure relatively easy. FIG. 2 illustrates the sequence of storing blocks in an exemplary RAID-1 mirrored disk array, wherein block A is written to the first disk, a copy A' of block A is written to the second disk, block B is written to the first disk, a copy B' of block B is written to the second disk, and so forth.

RAID-4 specifies a block-interleaved, dedicated parity-disk array. In RAID-4, each entire block is written onto data disks, and a non-data disk called a parity disk is used to store parity blocks. Each parity block is typically generated by exclusive-OR (XOR) combining data contained in corresponding same-rank blocks on the data disks. To provide write verification, RAID-4 specifies that writes to the parity disk take place for each data block stored on a data disk. To provide read verification, reads from the parity disk take place for each data block that is read from a data disk. RAID-4 requires a minimum of three drives to implement and has a relatively high read-data transaction rate. High efficiency of a RAID-4 array correlates with a low parity-disk/data-disk ratio. RAID-4 exhibits relatively high read-data transaction rates, relatively high aggregate-read-transfer rates, and block-read-transfer rates equal to those of a single disk. Disadvantageously, however, RAID-4 has low write-transaction rates and relatively low write-aggregate-transfer rates. However, data can be rebuilt in the event of disk failure. FIG. 3 illustrates the sequence of storing blocks in an exemplary RAID-4 dedicated-parity disk array, wherein block A is written to the first disk, block B is written to the second disk, and then a parity block is generated by XOR-combining blocks A and B. The parity block pAB for blocks A and B is stored on the third disk. Block C is then written to the first disk, block D is written to the second disk, and so forth.

RAID-5 specifies a block-interleaved, distributed-parity disk array. In RAID-5, each entire data block is written on a data disk, and a parity block for the corresponding data blocks in the same rank is generated. The parity blocks are recorded in locations that are distributed across the disks in the array and are later verified on reads of data blocks. RAID-5 requires a minimum of three drives to implement, exhibits a relatively high read-data-transaction rate, a medium write-data-transaction rate, and relatively good aggregate transfer rates, and individual block data-transfer rates are about the same as those of a single disk. High efficiency of a RAID-5 array correlates with a low parity-disk/data-disk ratio. In RAID-5, disk failure has only a relatively-medium impact on throughput, but rebuilding data is difficult relative to, e.g., RAID-1. FIG. 4 illustrates the sequence of storing blocks in an exemplary RAID-5 distributed-parity disk array, wherein block A is written to the first disk, block B is written to the second disk, and then a parity block is generated by XOR-combining blocks A and B. The parity block pAB for blocks A and B is stored on the third disk. Block C is then written to the fourth disk, block D is written to the fifth disk, and then a parity block is generated by XOR-combining blocks C and D. The parity block pCD for blocks C and D is stored on the first disk. Block E is then written to the second disk, block F is written to the third disk, and so forth.

It is noted that a RAID array can implement multiple nested RAID levels, thereby conforming to the specifications of two or more RAID levels. For example, as shown in the exemplary RAID-1+0 (or "RAID-10") array of FIG. 5, blocks written to the disk array are mirrored and then striped. Block A is written to the first disk, a copy A' of block A is written to the second disk, block B is written to the third disk, a copy B' of block B is written to the fourth disk, block C is written to the first disk, a copy C' of block C is written to the second disk, block D is written to the third disk, a copy D' of block D is written to the fourth disk, and so forth.

Alternatively, as shown in the exemplary RAID-0+1 array of FIG. 6, blocks written to the disk array are striped and then mirrored. Block A is written to the first disk, block B is written to the second disk, a copy A' of block A is written to the third disk, a copy B' of block B is written to the fourth disk, block C is written to the first disk, a copy C' of block C is written to the second disk, and so forth.

Other combinations of RAID-array levels and arrays having different numbers of disk drives per array are possible, and other RAID configurations and levels exist (e.g., RAID-6 and RAID-50), although not specifically mentioned or discussed herein.

As discussed above, RAID levels 1, 4, and 5 support redundancy, i.e., if any one drive fails, the data for the failed drive can be reconstructed from the remaining drives. If such a RAID array is operating with a single drive identified as failed, it is said to be operating in a degraded mode. RAID-1 and RAID-4/RAID-5 provide redundancy of data using different methods. RAID-1 provides data redundancy by mirroring, i.e., maintaining multiple complete copies of the data in a volume. Data being written to a mirrored volume is reflected in all copies, such that, if a portion of a mirrored volume fails, the system continues to use the other copies of the data. RAID-5 provides data redundancy by using the stored parity information, which is used to reconstruct data after a failure. Since parity information is calculated by performing a known XOR procedure on data being written to a RAID-5 volume, if a portion of a RAID-5 volume fails, the data that was on that portion of the failed volume can be recreated by calculating the correct data using the remaining data and parity information.

Conventional RAID arrays suffer from a number of disadvantages, including the following.

RAID arrays typically use either (i) fixed-hardware implementations that permit a group of drives to appear as one or (ii) software implementations that use the host computer's CPU to perform RAID operations. Disadvantageously, such traditional hardware implementations are inflexible, and such software implementations use processor and memory overhead. Moreover, neither permits a single set of physical drives to be used in more than one configuration at a time.

In conventional RAID arrays, during write operations, one sector of data at a time is sent to various physical disks in the array, and such transfer of data is typically managed by software running on the host computer, which calculates and provides addresses on these physical disks at which the data will be written. Thus, memory and processor resources of the host computer must be used.

Moreover, in such arrays, a disk controller communicates directly with physical disks in the array. When writing to the disks, the controller must wait for the physical disk to be ready for the write operation, or software buffering by the host computer must be performed.

Additionally, during read and write operations in a conventional RAID array, one entire stripe is buffered at a time and stored (typically in memory on the host computer) so that parity calculations can be made, thereby requiring substantial processor and memory resources for this cumbersome storage and calculation process.

In conventional RAID arrays, an entire RAID array is unavailable for reading and writing while a volume is being reconstructed, and reconstruction typically involves running software on a host computer while all of the drives of the array are taken offline.

Another limiting aspect of conventional RAID arrays is that a user can define only a single profile defining parameters for the set of physical disk drives (or other storage devices) in the array. Such arrays store and retrieve data block-by-block, and the block size for an array is typically determined in the profile from the outset, before any data is ever written to the drives. This block size does not change after storage to the disks has begun.

Also in the profile, traditional arrays identify disk drives as physical drives in the order in which they are stored in the array's physical drive bays (i.e., slot 0, slot 1, slot 2). The order of drives can be changed only by physically removing, exchanging, or inserting drives within the drive bays. Drives can be added to a RAID array only when they are physically present in the array, and when drives are removed from the array, no configuration information for these drives is stored. Also, drive partitioning cannot be adjusted and resized on an ad-hoc basis, but, as with block size, this can only be done before the first data is ever written to the disks.

The drives in conventional RAID arrays are limited to a single file system, and there is no way for different portions of the same physical disk array to be used concurrently, except as part of one of the RAID-level schemes (e.g., mirroring or striping), as discussed above.

Excess capacity on disk drives in a physical disk drive array cannot be used when integrating physical drives of varying sizes into traditional RAID arrays, and all drives in the array are limited to using only the amount of storage available on the smallest-sized drive in the array. For example, in a traditional RAID array containing three 40 GB drives, if a fourth drive of 120 GB drive is added, only 40 GB of the fourth drive can be used.

SUMMARY OF THE INVENTION

In one embodiment, the present invention provides an apparatus for reading from a physical storage-device array including a plurality of storage devices. The physical storage-device array has a plurality of sector levels, each sector level containing one sector on each storage device in the array at corresponding addresses on across the storage devices. The apparatus includes: (1) a memory adapted to store two or more profiles, each profile defining (i) a virtual array associated with a selected set of the storage devices and (ii) one or more parameters used for accessing information from the virtual array; (2) a buffer (i) having a first portion and a second portion and (ii) coupled to receive data from the storage devices; and (3) a state machine (i) coupled to the buffer and the memory and (ii) adapted to generate two or more successive pairs of instructions. The first instruction of each pair of instructions (i) is based on one or more parameters of a first profile and (ii) is an instruction to read, into the first portion of the buffer, one sector of data from each storage device of a first virtual array; and the second instruction of each pair of instructions (i) is based on one or more parameters of a second profile and (ii) is an instruction to read, into the second portion of the buffer, one sector of data from each storage device of a second virtual array.

In another embodiment, the present invention provides a method for reading from a physical storage-device array comprising a plurality of storage devices using a buffer having a first portion and a second portion. The physical storage-device array has a plurality of sector levels, each sector level containing one sector on each storage device in the array at corresponding addresses across the storage devices. The method comprises: (a) accessing first and second profiles, each profile defining (i) a virtual array associated with a selected set of the storage devices and (ii) one or more parameters used for accessing information from the virtual array; and (b) generating two or more successive pairs of instructions. The first instruction of each pair of instructions (i) is based on one or more parameters of a first profile and (ii) is an instruction to read, into the first portion of the buffer, one sector of data from each storage device of a first virtual array. The second instruction of each pair of instructions (i) is based on one or more parameters of a second profile and (ii) is an instruction to read, into the second portion of the buffer, one sector of data from each storage device of a second virtual array.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 illustrates a rotating parity-placement striping scheme in an exemplary RAID-5 five-disk array in one embodiment of the present invention;

FIG. 9 illustrates an exemplary data-sector addressing scheme consistent with one embodiment of the present invention;

FIG. 11 is a timing diagram depicting the transmission of data and control signals from the Traffic Manager/Arbiter (TMA) to the RAID Encoder/Decoder (RDE);

FIG. 12 is a frame-format diagram showing the format for tma_rde_data[31:0];

FIG. 15 is a timing diagram depicting the transmission of data and control signals from the Traffic Manager/Arbiter (TMA) to the RAID Encoder/Decoder (RDE);

FIG. 16 is a frame-format diagram showing the format for rde_mdc_data[31:0] storage request frames;

FIG. 17 is a frame-format diagram showing the format for rde_mdc_data[31:0] retrieval request frames;

FIG. 18 is a timing diagram depicting the transmission of data and control signals from the Multi-Drive Controller (MDC) to the RAID Encoder/Decoder (RDE);

FIG. 19 is a frame-format diagram showing the format for mdc_rde_data[31:0] retrieval response-request frames;

FIG. 20 is a frame-format diagram showing the format for mdc_rde_data[31:0] storage response-request frames;

DETAILED DESCRIPTION

Acronyms and Abbreviations

Figure 1:
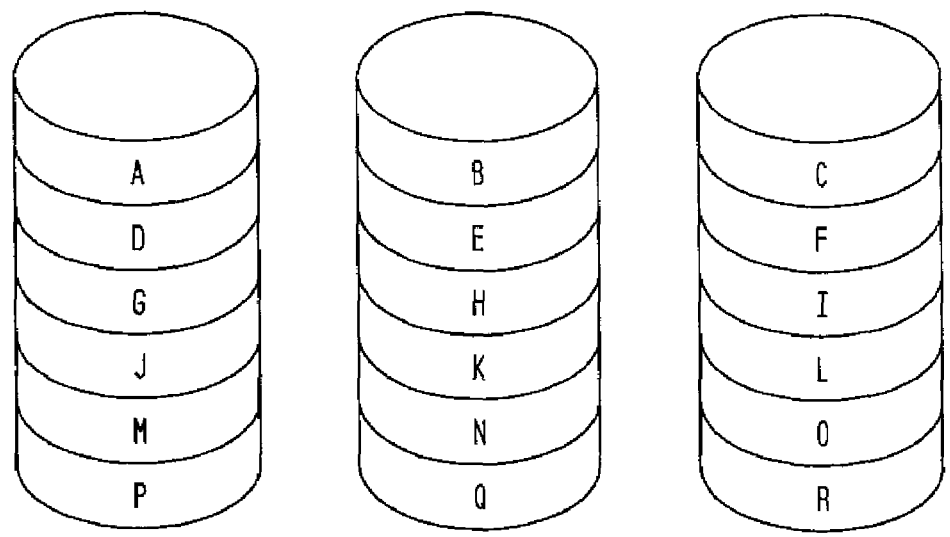
FIG. 1 illustrates the sequence of storing blocks in an exemplary RAID-0 striped disk array.
Figure 2:
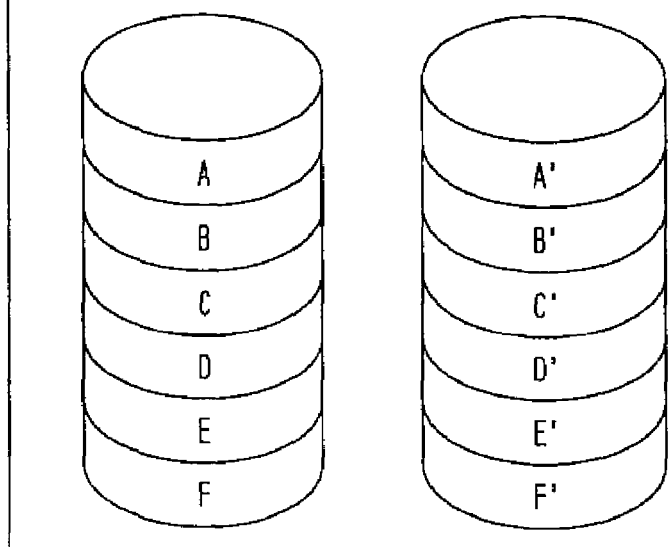
FIG. 2 illustrates the sequence of storing blocks in an exemplary RAID-1 mirrored disk array.
Figure 3:
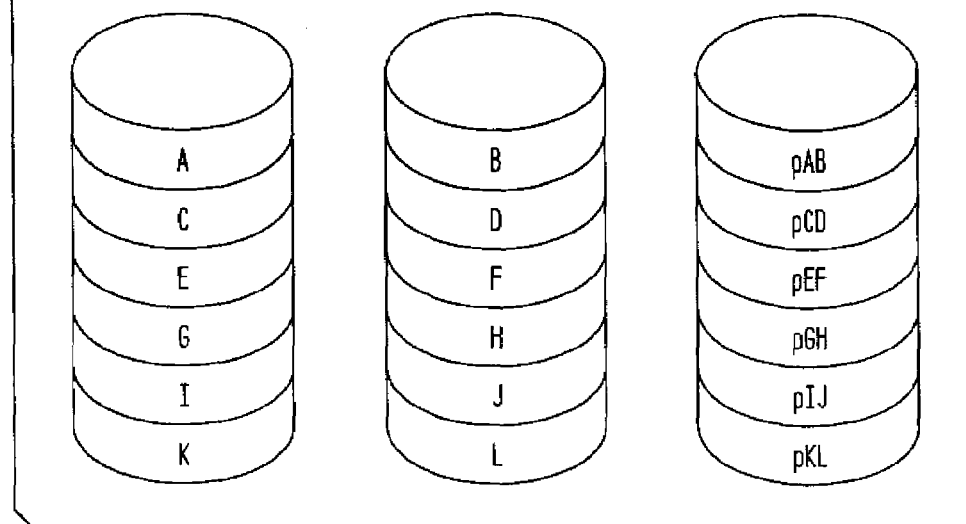
FIG. 3 illustrates the sequence of storing blocks in an exemplary RAID-4 block-interleaved, dedicated-parity disk array.
Figure 4:
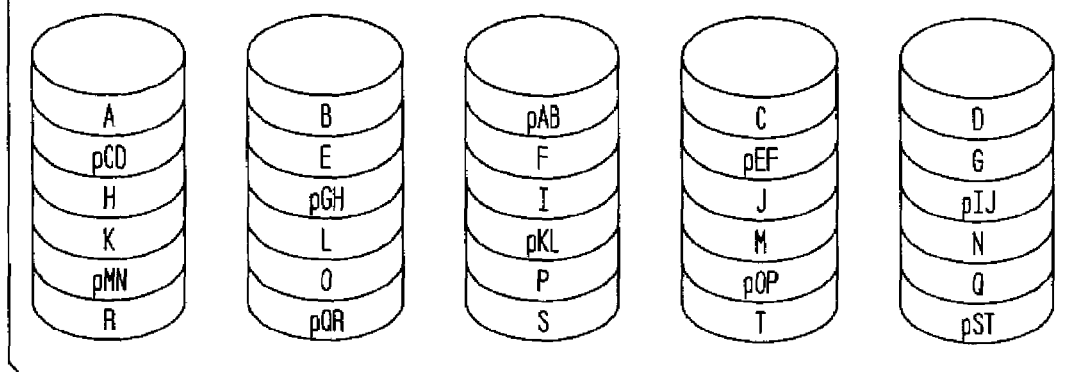
FIG. 4 illustrates the sequence of storing blocks in an exemplary RAID-5 block-interleaved, distributed-parity disk array.
Figure 5:
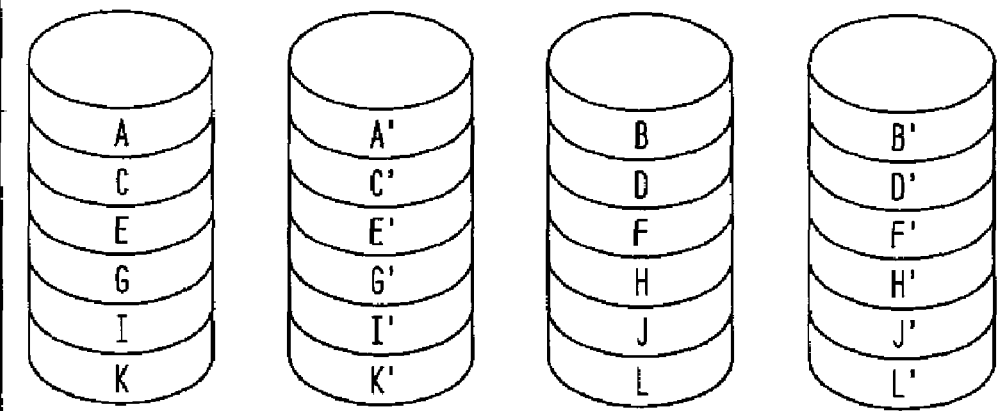
FIG. 5 illustrates the sequence of storing blocks in an exemplary RAID-1+0 (or "RAID-10") disk array.
Figure 6:
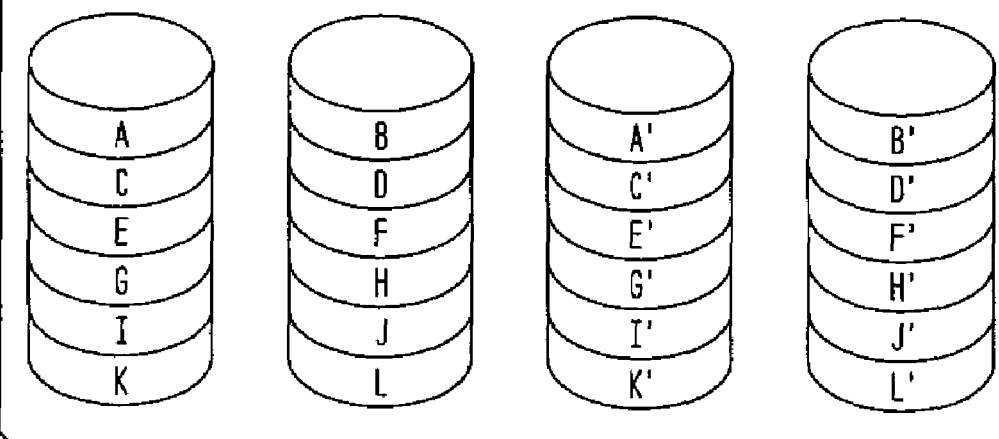
FIG. 6 illustrates the sequence of storing blocks in an exemplary RAID-0+1 disk array.

For reference, the following is a list of acronyms and abbreviations used herein.

| | |
|---|---|
| AAI | AAP Interface sub-block |
| AAP | Application Processor |
| AHB | AMBA High-Performance Bus |
| AMBA | Advanced-Microprocessor Bus Architecture |
| BPR | Block-Parity Reconstructor sub-block |
| CSR | Control/Status Register sub-block |
| DID | Logical-Drive Identifier |
| DMA | Direct-Memory Access |
| DSA | Data-Sector Address |
| DSU | Data-Sector Unit |
| HDTV | High-Definition Television |
| HTTP | Hypertext-Transport Protocol |
| IP | Internet Protocol |
| IRF | Issued-Request FIFO |
| K | Chunk size |
| LAN | Local-Area Network |
| LBA | Logical-Block Address |
| ldeg | Logical drive number of degraded drive |
| LENGTH | Variable Transfer Length in DSUs |
| MDC | Multi-Drive Controller |
| PARROT | Parity-Rotation Index |
| PAR_DID | DID of a PSU |
| PBP | Parity-Block Processor sub-block |
| PDID | Physical-Drive Identifier |
| PSB | Parity-Sector Buffer |
| PSU | Parity-Sector Unit |
| PTC | Peripheral-Traffic Controller |
| QID | Queue ID |
| RAC | RAID-Array Cluster |
| RAID | Redundant Array of Independent (or Inexpensive) Disks |
| RAID5_DID | RAID-5 Logical-Drive Identifier |
| RCFR | Read-Response Configuration Registers |
| rCTL | RDE-Control Register |
| RDE | RAID Encoder/Decoder |
| RHER | Response-Header Error Register |
| RHIBR | Response-Header Information-Buffer Register |
| RHIR | Response-Header Information Register |
| RIF | Read-Interface sub-block |
| RIRR | Request-Information Response Registers |
| RISM | Read-Interface State Machine |
| ROS | Read-Operation Sequencer sub-block |
| ROSM | Read-Operation State Machine |
| ROSR | Read-Operation State Registers |
| RPSB | Retrieval Parity-Sector Buffer |
| rRAC | RAC-Profile Registers |
| rRERR | Error-Status Registers |
| RTP | Real-Time Transport Protocol |

-continued

| | |
|---|---|
| SATA | Serial Advanced-Technology Attachment |
| SMC | Shared-Memory Controller |
| SSEQ | Sector Sequencer |
| SSU | Stripe-Sector Unit |
| SSU_DSU_OFFSET | Offset of a DSA within an SSU |
| SSUB | SSU Buffer |
| STRIPE | Stripe index |
| STRIPE_DSU_OFFSET | Offset of the first DSU of an SSU within a stripe |
| TCP | Transport-Control Protocol |
| TMA | Traffic Manager/Arbiter |
| TMI | Traffic-Manager Interface sub-block |
| UDP | User-Datagram Protocol |
| ULP | Upper-Layer Processor |
| USB | Universal Serial Bus |
| VAP | Virtual-Array Profile |
| WAN | Wide-Area Network |
| WCFR | Write-Request Configuration Registers |
| WHER | Write-Header Extraction Registers |
| WHIBR | Write-Header Information Buffer Register |
| WHIR | Write-Header Information Registers |
| WIBR | Write-Information Buffer Registers |
| WIF | Write-Interface sub-block |
| WISM | Write-Interface State Machine |
| WOS | Write-Operation Sequencer sub-block |
| WOSM | Write-Operation State Machine |
| WOSR | Write-Operation State Registers |
| WPF | Pending-Write Request FIFO |
| XCNT | Transfer Count in Sectors |
| XOR | Exclusive OR |

Definitions

Certain terms used herein are defined as follows.

The term "disk array," "RAID array," "drive array," and "array" are used interchangeably herein to identify a RAID array, i.e., a physical array of two or more disk drives, wherein the individual disks in the array are identified as disk0, disk1, and so forth.

The terms "disk," "hard disk," "drive," "disk drive," "hard drive," "volume," and "member" are used interchangeably herein to refer to a storage device in an array and should not be construed as limiting such storage devices to any one particular type of device (e.g., optical, magnetic, removable, etc.).

The terms "RAID-Array Cluster" (RAC), "cluster," "array cluster," "virtual-array cluster," "virtual array," and "virtual RAC" are used to refer to a virtual-RAID array, as defined by a Virtual-Array Profile (VAP) (also referred to herein as a "profile," an "array profile," an "RAC profile," or "cluster profile"). In certain embodiments of the invention, a plurality of virtual arrays exist, each having a VAP that defines the parameters of the virtual RAC. In prior art RAID arrays, a single set of physical disks is defined by only a single profile that might be modified from time to time. However, in embodiments of the invention employing virtual arrays, a plurality of VAPs can simultaneously exist for a single set of physical disk drives, and the structure and functionality of such embodiments permit more than one virtual array for the same set of physical disks to be addressed and used substantially concurrently for read and/or write operations.

A sector is the basic unit of read and write operations and consists of a uniquely addressable set of predetermined size, usually 512 bytes. Sectors correspond to small arcs of tracks on disk-drive platters that move past read/write heads on a disk as the disk rotates.

A "chunk" (also referred to herein as a "block") is the smallest amount of data per write operation that is written to an individual disk in an array, expressed as an integer multiple of sectors. This amount is referred to as the array's "chunk size." A chunk contains either parity information or data. The maximum chunk size in the embodiments described herein is less than 256 sectors.

A Data-Sector Unit (DSU) is a sector's worth of data.

A Data-Sector Address (DSA) is a 32-bit numerical address that is used to refer to a particular DSU in the array, as described below with reference to FIG. 9. In a DSA-addressing scheme, sectors are numbered sequentially from 0 to D−1, where D is the total number of DSUs in the whole RAID array.

A Parity-Sector Unit (PSU) is a sector's worth of parity information. In a disk array with N drives, a PSU is derived from the bit-wise XOR of the data in the N−1 DSUs of a Stripe-Sector Unit (SSU), as described in further detail below.

A Logical-Block Address (LBA) is a 48-bit numerical address that is used to refer to a sector on an individual disk drive. In an LBA-addressing scheme, sectors are numbered sequentially from 0 to S−1, where S is the total number of sectors on a disk drive.

A Stripe-Sector Unit (SSU) is a set of sectors that includes one sector collected from each drive in the array. The set of sectors in an SSU share the same LBA, and thus, a specific SSU is referenced by the common LBA of its member sectors. For a block-interleaved, distributed-parity disk array with N drives, an SSU holds N−1 data sectors, plus one sector of parity information. The term "sector level" will be used to refer collectively to the corresponding addresses of the drives at which an SSU is stored.

A stripe is a set of chunks that includes one chunk collected from each drive in the array. The term "stripe index" will be used to refer to a numerical address identifying a stripe within an array.

Data-Storage System Overview

Figure 7:
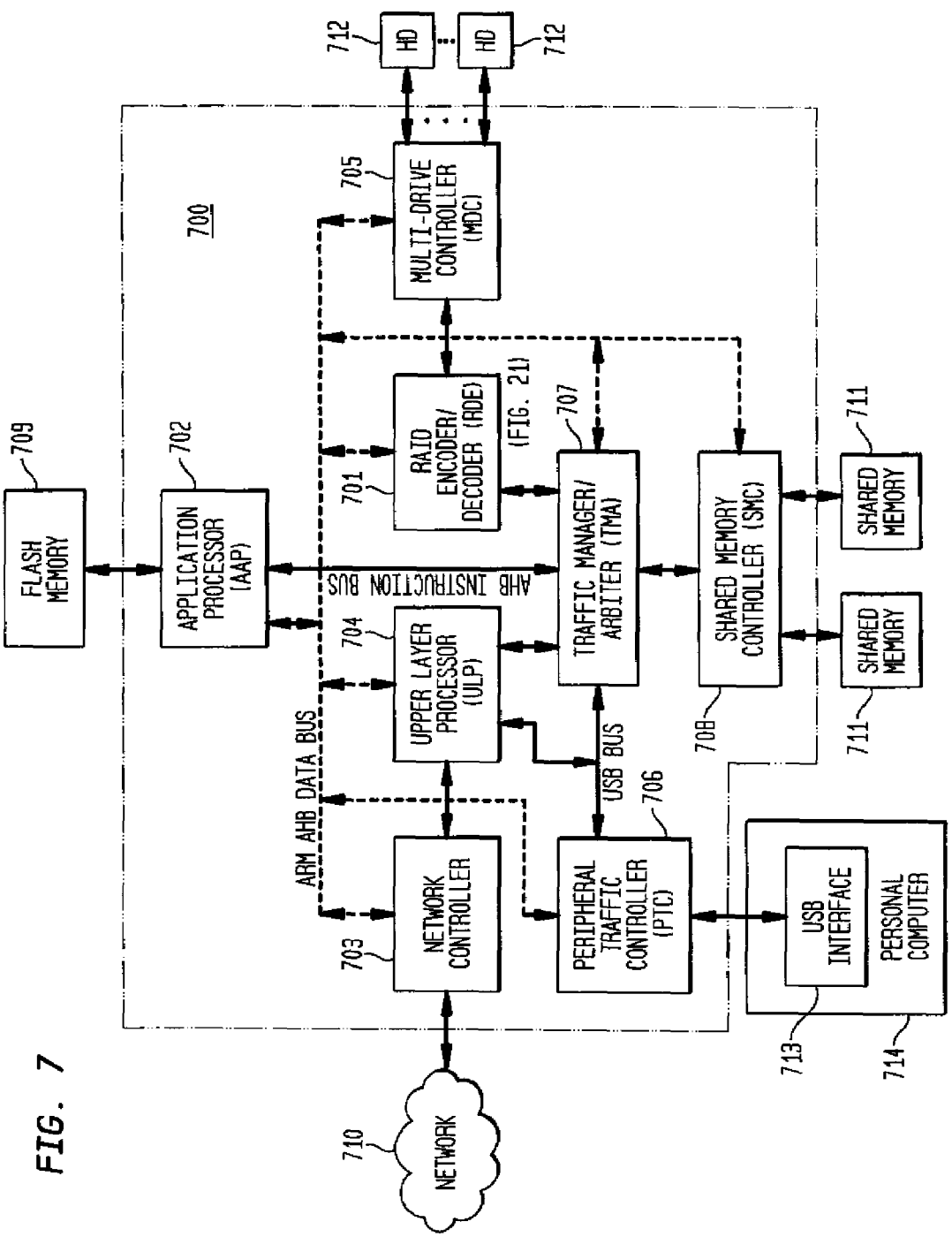
FIG. 7 illustrates an exemplary data storage system including a disk array encoder/decoder in one embodiment of the present invention.

FIG. 7 illustrates a data-storage system 700 in which a RAID encoder/decoder (RDE) 701 in one embodiment of the present invention is used. While the acronym RDE (RAID Encoder/Decoder) will be used herein to refer to block RDE 701, it should be understood that RDE 701, as well as other components and aspects of the present invention, could be used with arrays of disks in which the storage of data is not actually redundant across disks, and that the use of the terms "RAID" and "RDE," as used herein, is in no way meant to be construed as limiting data storage to such redundant data storage. It should also be recognized that, while the following description refers generally to storage (recording) to disk and retrieval (playback) from disk of media objects containing audio and/or video data, e.g., for use with a personal computer, the invention is not limited to such objects, data, hardware, or software and may be alternatively or additionally used with other types of objects, data, hardware, or software.

An overview of system 700 will now be provided. System 700 includes Application Processor (AAP) 702, network controller 703, Upper-Layer Processor (ULP) 704, RDE 701, Multi-Drive Controller (MDC) 705, Peripheral-Traffic Controller (PTC) 706, Traffic Manager/Arbiter (TMA) 707, and Shared-Memory Controller (SMC) 708. In a preferred embodiment, all of the elements of system 700 reside on a single integrated circuit.

AAP 702 may be, e.g., an ARM 32-bit RISC processor implementing assembly-language programming and running a Linux variant. It should be understood that, while AAP 702 receives instructions in assembly language, for ease of reference herein, instructions for AAP 702, as well as for other programmable components of system 700, will be described in exemplary pseudocode and/or program code as embodied in one or more high-level programming languages. AAP 702 is coupled to an interface with a memory, such as FLASH memory device 709. To communicate with each of the various blocks of system 700, AAP 702 has separate instruction and data caches for each block, as well as separate instruction and data-bus interfaces with each block. TMA 707 and FLASH memory device 709 interface to AAP 702 across instruction interfaces and data interfaces, because both TMA 707 and FLASH memory device 709 contain instructions and data used by AAP 702. FLASH memory device 709 may contain, e.g., boot code for AAP 702 to permit configuration of various registers of system 700.

Network controller 703 may be, e.g., a Gigabit Ethernet (1000 Mbits/second) controller and is coupled to interface with a standard network 710, such as an external LAN or WAN or the Internet, for communicating with various computers and other devices.

ULP 704 implements, in hardware, upper-layer protocol-processing functionality for system 700. Such processing may include, e.g., Internet-layer (Layer 3), transport-layer (Layer 4), and application-layer (Layer 5 and above) processing and may implement one or more protocol types including, e.g., Internet Protocol (IP) (version 4 and version 6), Transport-Control Protocol (TCP), User-Datagram Protocol (UDP), Real-time Transport Protocol (RTP), and Hypertext-Transport Protocol (HTTP).

RDE 701 performs RAID encoding and decoding of data in shared memory 711 for storage onto and retrieval from a multiple-disk array that includes hard drives 712, e.g., between 3 and 8 Serial-AT Attachment (SATA) drives. RDE 701 translates between (i) LBAs, which refer to sectors of individual disk drives 712, and (ii) DSAs and SSUs, which refer to sectors with respect to the entire array, as will be explained in further detail below.

MDC 705 provides a point-to-point multiple-independent channel interface, e.g., a high-speed unidirectional SATA interface employing Direct-Memory Access (DMA) for storage and retrieval operations and supporting first-generation data rates of 1.5 Gbps (150 MB/s), through which RDE 701 stores data on one or more of hard disks 712, e.g., in a RAID configuration. For a write operation, a starting LBA is generated by RDE 701 and provided to MDC 705 along with DSUs to be written. MDC 705 formats the received data into frames, encodes the data, appends a CRC, and serializes the data for transmission across the SATA interface. For a read operation, MDC 705 deserializes and decodes received data to be read and checks the received data for integrity prior to transferring the received data to RDE 701. To minimize latency, RDE 701 simultaneously distributes data being written to or read from drives 712 of the array, one stripe (set of chunks) at a time. MDC 705 also interfaces with AAP 702 for read/write access to command and control registers residing in a SATA controller (not shown) included in MDC 705.

PTC 706 enables system 700 to communicate with external devices over a Universal Serial Bus (USB) interface and employs a USB controller coupled to ULP 704, TMA 707, and AAP 702. PTC 706 provides a single USB core that can function as either a host or a peripheral USB device. Thus, in addition to using network controller 703 (e.g., an Ethernet port) to connect with networked devices, system 700 can also use PTC 706 to provide an additional mechanism to connect with external devices, e.g., a USB-based Wireless-LAN adapter, a media read/write device, a digital camera, or a remote control device.

TMA 707 manages (i) media traffic arriving from network 710 for storage, (ii) control traffic arriving for processing by AAP 702, and (iii) playback traffic during retrieval from storage. TMA 707 includes a buffer manager and a scheduler. The buffer manager allocates and de-allocates buffers during the media object re-assembly process, the playback process, and accesses of AAP 702. The scheduler manages shared resources, such as memory-access bandwidth and disk-access bandwidth, and provides guaranteed bandwidth and latency guarantees for media objects during playback.

SMC 708 may be a DDR II memory controller and is coupled to interface with one or more external shared memories 711, such as standard DDR II SDRAM devices. PTC 706 is coupled to interface with an external data interface, such as a USB interface 713 of a personal computer 714. MDC 705 is coupled to interface simultaneously with multiple hard disks 712 in the storage-device array, over a plurality of independent channels, one channel per hard disk.

AAP 702, network controller 703, ULP 704, RDE 701, MDC 705, PTC 706, TMA 707, and SMC 708 are coupled to interface with one another via a data bus, e.g., an Advanced-Microprocessor Bus Architecture (AMBA) High-Speed bus (AHB). In addition to being coupled via the AHB data bus, PTC 706, TMA 707, and ULP 704 are coupled to interface with one another via another data bus, e.g., a USB bus. TMA 707 and AAP 702 are also coupled to interface with one another via an instruction bus, e.g., an AHB instruction bus.

As illustrated by the various directional arrows in FIG. 7, system 700 has two separate data paths: (i) a receive path, which is the direction by which traffic flows from external devices to system 700, and (ii) a transmit path, which is the direction by which traffic flows from system 700 to external devices. Packet-based transfers flow through ULP 704 (i) to and from network controller 703 and (ii) to and from PTC 706. Non-packet-based transfers flow directly between PTC 706 and TMA 707 via the USB bus.

In the receive path, one or both of network controller 703 and PTC 706 receives packets (e.g., Ethernet packets) from a physical interface. Network controller 703 performs various protocol-related checking, e.g., packet-integrity verification and multicast-address filtering. The packets are then passed to ULP 704 for further processing. Such further processing may include, e.g., extracting and parsing Layer-2, Layer-3, and Layer-4 header fields to form an address and performing a lookup based on the address. Using the lookup result, ULP 704 decides where to send the received packet. A packet arriving over an already-established connection is tagged with a pre-defined Queue ID (QID), which is used by TMA 707 for traffic-queuing purposes.

A packet arriving over a connection that has not yet been established, e.g., from an unknown connection, is tagged with a special QID and is routed to AAP 702 for further investigation. The final destination of a packet that has arrived and is processed by AAP 702 will be either one or more of hard disks 712 for storage, e.g., if the packet carries media content, or TMA 707 for further investigation, e.g., if the packet carries a control message or cannot be recognized by AAP 702. TMA 707 stores arriving packets in shared memory 711. If a packet contains an incoming media object, the incoming media object data is stored in shared memory 711 and is transferred to RDE 701 for storage on one or more of hard disks 712. TMA 707 manages the storage process by providing appropriate control information to RDE 701. Packets, such as control messages, that are destined for inspection by AAP 702 are stored in shared memory 711 as well, and AAP 702 has access to read stored packets out of shared memory 711 and to write packets to shared memory 711. AAP 702 is also configured to use this read/write access to shared memory 711 to re-order any packets that were received out of order.

A portion of shared memory 711 and hard disks 712 contains program instructions and data for AAP 702. TMA 707 manages access to shared memory 711 and hard disks 712 by transferring control information between shared memory 711 and hard disks 712. TMA 707 also enables AAP 702 to insert data into and extract data from an existing packet stream. RDE 701 encodes data blocks from shared memory 711 and writes the encoded data blocks onto one or more of hard disks 712 via MDC 705.

In the transmit path, TMA 707 manages requests to retrieve, from one or more of hard disks 712, objects that are destined to AAP 702 or network controller 703. Upon receiving a media-playback request from AAP 702, TMA 707 receives the media-object data transferred from one or more of hard disks 712 through MDC 705 and RDE 701 and stores the received data in shared memory 711. TMA 707 then schedules the data to ULP 704, according to (i) the type of media (e.g., audio or video) stored therein and (ii) the expected bandwidth requirements for the media object. For each outgoing packet, ULP 704 encapsulates the data, e.g., with Ethernet and Layer-3/Layer-4 headers. The packets are then routed, based on the destination port specified, either to network controller 703 (e.g., for Ethernet packets) or to PTC 706 (e.g., for packets exchanged via USB interface 713).

RDE Parity-Placement, Data-Sector Addressing, and Calculations

Given the context of exemplary system 700 in which RDE 701 is used, the particular structure and function of RDE 701 will now be described in further detail, beginning with an explanation of the parity-placement scheme, data-sector addressing scheme, and calculations used by RDE 701 in one embodiment of the invention.

FIG. 8 illustrates a rotating parity-placement striping scheme employed by RDE 701 in an exemplary RAID-5 array in one embodiment of the present invention. Lowercase letters represent chunks of data stored on disk0 through disk4 as follows. The following five chunks are stored at the same time: Chunk a is stored on disk0, chunk b is stored on disk1, chunk c is stored on disk2, chunk d is stored on disk3, and parity chunk P0 (which was generated by XOR-combining chunks a, b, c, and d) is stored on disk4. Next, the following five chunks are stored at the same time: chunk e is stored on disk0, chunk f is stored on disk1, chunk g is stored on disk2, parity chunk P1 (which was generated by XOR-combining chunks e, f, g, and h) is stored on disk3, and chunk h is stored on disk4. Next, the following five chunks are stored at the same time: chunk i is stored on disk0, chunk j is stored on disk1, parity chunk P2 (which was generated by XOR-combining chunks i, j, k, and l) is stored on disk2, chunk k is stored on disk3, and chunk l is stored on disk4. Next, the following five chunks are stored at the same time: chunk m is stored on disk0, parity chunk P3 (which was generated by XOR-combining chunks m, n, o, and p) is stored on disk1, chunk n is stored on disk2, chunk o is stored on disk3, and chunk p is stored on disk4. Next, the following five chunks are stored at the same time: parity chunk P4 (which was generated by XOR-combining chunks q, r, s, and t) is stored on disk0, chunk q is stored on disk1, chunk r is stored on disk2, chunk s is stored on disk3, and chunk t is stored on disk4. Next, the following five chunks are stored at the same time: chunk u is stored on disk0, chunk v is stored on disk1, chunk w is stored on disk2, chunk x is stored on disk3, and then parity chunk P5 (which was generated by XOR-combining chunks u, v, w, and x) is stored on disk4, and so forth. In this scheme, parity rotation through data is by stripes of chunks. In other words, in this rotating-parity scheme, parity chunks are distributed in round-robin manner across the drives of the disk array and through the data chunks of the stripes, such that each stripe contains exactly one parity chunk, and each subsequent stripe contains a parity chunk in a position that is "left-rotated" from that of the parity chunk of the current stripe. It should be understood that alternative parity placements are possible in various embodiments of the present invention. For example, alternative embodiments could employ a right-symmetric parity scheme or a different parity scheme wherein one chunk of parity per stripe is written.

FIG. 9 illustrates an exemplary DSA data-sector addressing scheme employed by RDE 701 in one embodiment of the present invention. As shown, the individual data sectors on disk0 through disk4 are numbered sequentially from 0 to D−1, where D is the total number of DSUs in the RAID array. PSUs P0, P1, and so forth, each of which contains a sector's worth of parity information, are not included in the DSA-addressing scheme, i.e., the sequential numbering is not advanced for PSUs. For example, the set of sectors having DSAs numbered [1, 5, 9, 13] constitutes a data chunk on disk1, whereas the set of sectors labeled [P0, P1, P2, P3] constitutes a parity chunk on disk4. Within each stripe, this DSA scheme advances from one disk to the next by SSU, rather than by chunk.

The foregoing DSA-addressing scheme permits logical translations between DSA and LBA addresses. The LBA of an SSU can be obtained by dividing the DSA by one less the number N of drives in the array. The remainder (SSU_DSU_OFFSET) is the offset of the DSA within an SSU. Thus:

LBA=DSA/(N−1); and
SSU_DSU_OFFSET=DSA mod (N−1).

The stripe index (STRIPE) can be obtained by dividing the DSA by the product of the chunk size (K) and one less the number of drives in the array, with the remainder from the division being the offset in DSUs from the beginning of the stripe. The STRIPE_DSU_OFFSET is the offset of the first DSU of an SSU within a stripe. Thus:

STRIPE=DSA/(K*(N−1));
STRIPE_DSU_OFFSET=DSA mod (K*(N−1));
STRIPE_SSU_OFFSET=STRIPE_DSU_OFFSET−SSU_DSU_OFFSET; and
SSU_OF_STRIPE=STRIPE_SSU_OFFSET/(N−1).

The Parity-Rotation Index (PARROT), which represents the number of disks through which to rotate beginning from the left-most disk, is the result of modulo division of the stripe index by the number of drives in the array. The Parity-Rotation Index ranges from 0 to one less than the number of drives in the array. Thus:

PARROT=STRIPE mod N; and
keep PARROT in [0 . . . N−1].

Logical-Drive Identifiers, also referred to herein as DIDs, are numerical identifiers used in operations that specify particular logical members (i.e., disk drives) of an array. DIDs range from 0 to one less than the number of drives in the array. Thus:

keep DID in [0 . . . N−1].

RDE 701 is capable of handling encoding and decoding operations for both RAID-4 and RAID-5 disk arrays. Since RAID-4 ignores parity rotation, a RAID-4 DID of a DSA within an SSU (RAID4_DID) is the remainder of the division of the DSA by the number of drives in the array. Thus:

RAID4_DID=DSA mod (N−1).

A PSU's DID (PAR_DID) is one less than the number of disk drives in the array less the Parity-Rotation Index. Thus:

PAR_DID=(N−PARROT−1).

A RAID-5 DID is the RAID-4 DID, adjusted for parity rotation. Thus:
    if (RAID4_DID<PAR_DID)
    then
    RAID5_DID=RAID4_DID
    else
    RAID5_DID=RAID4_DID+1
    fi.

Given a Parity-Rotation Index and a RAID-5 DID, the corresponding logical RAID-4 DID can be obtained, as follows:
    if (RAID5_DID==(N−PARROT−1))//PAR_DID?
    then
    RAID4_DID=N−1
    elsif (RAID5_DID<(N−PARROT−1))
    RAID4_DID=RAID5_DID
    else
    RAID4_DID=RAID5_DID−1
    fi Physical-Drive Identifiers (PDIDs) are numerical identifiers identifying the actual physical drives in the disk array. The mapping of a RAID5_DID to the corresponding PDID is stored in the array's VAP, as stored in RAC-Profile Registers (rRAC), which are described in further detail below (and shown in Tables 21-25).

TMA 707 provides a variable transfer length (LENGTH), expressed as the number of DSUs that are to be distributed over the array. For data retrieval, any non-zero offset is added to LENGTH in order to retrieve entire SSUs. This per-drive offset is the operative number of SSUs per drive, which number is obtained by dividing the sum of LENGTH and the offset by one less than the number of drives in the array, and then rounding the quotient up. This Transfer Count (XCN7), expressed in sectors, is provided to MDC 705 for each of the disks in the array. Thus:
    if ((LENGTH+SSU_DSU_OFFSET) mod (N−1)=0)
    then
    XCNT=(LENGTH+SSU_DSU_OFFSET)/(N−1)
    else
    XCNT=((LENGTH+SSU_DSU_OFFSET)/(N−1))+1
    fi.

RDE Interface with AAP, TMA, and MDC

Figure 10:
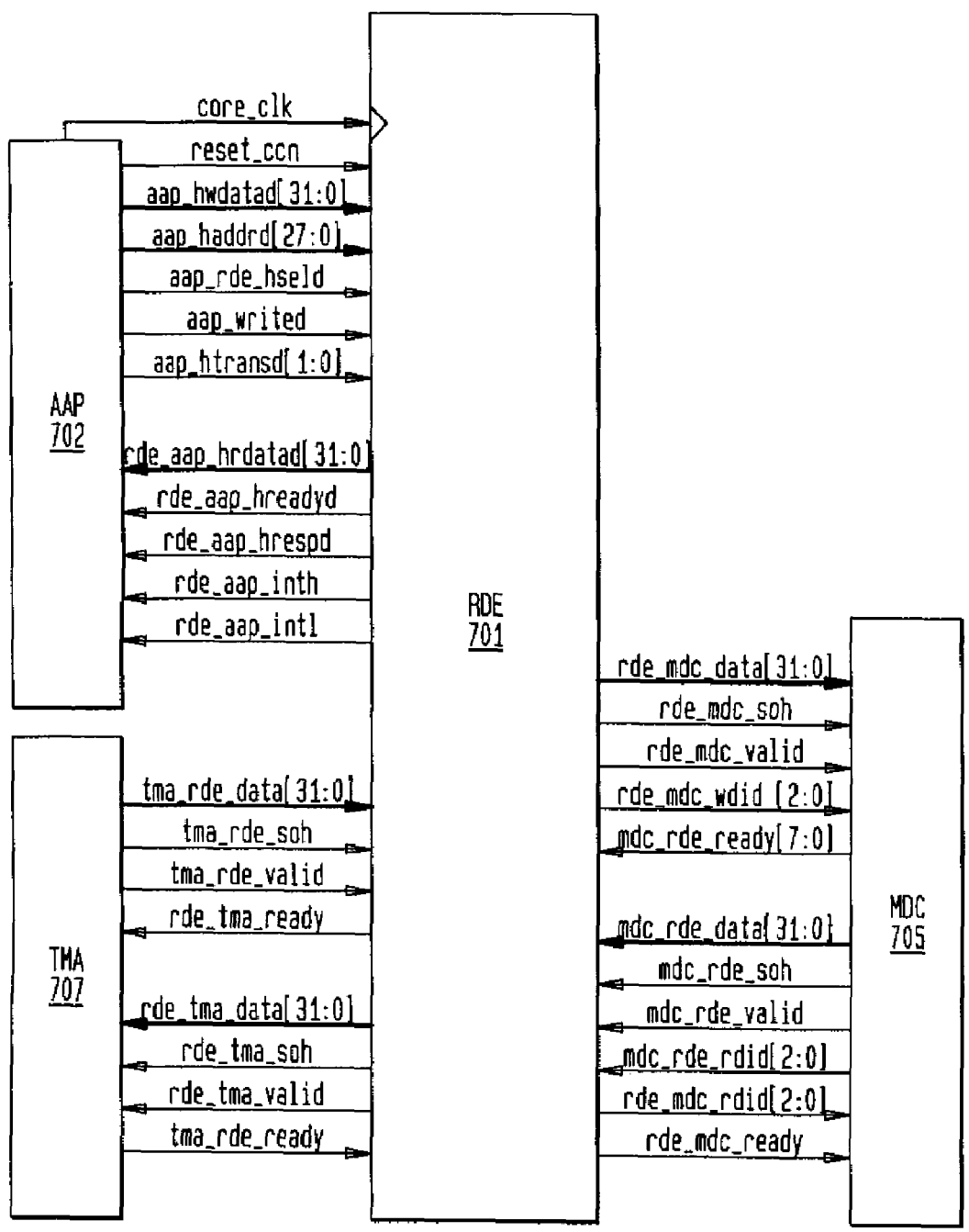
FIG. 10 is an interface diagram illustrating signals that the RAID Encoder/Decoder (RDE) exchanges with the Application Processor (AAP), the Traffic Manager/Arbiter (TMA), and (iii) the Multi-Drive Controller (MDC)

FIG. 10 is an interface diagram illustrating signals that RDE 701 exchanges with (i) AAP 702, (ii) TMA 707, and (iii) MDC 705.

As core signals, AAP 702 provides to RDE 701 (i) 1-bit pulse signal reset_cc_n, which enables a global reset of RDE 701, and (ii) 1-bit clock signal core_clk, which is the basic core clock pulse fed to all components of system 700 and is desirably nominally 125 mHz.

To control data flow from TMA 707 to RDE 701, the following signals are exchanged. TMA 707 provides to RDE 701 (i) 32-bit data signal tma_rde_data[31:0], which contains data and/or control dwords (data elements), (ii) 1-bit control signal tma_rde_soh, which is used to mark a start of header (SOH) on tma_rde_data[31:0], and (iii) 1-bit control signal tma_rde_valid, which indicates whether signals tma_rde_data[31:0] and tma_rde_soh are valid. RDE 701 provides to TMA 707 1-bit control signal rde_tma_ready, which indicates whether RDE 701 is ready to accept tma_rde_data[31:0].

To control data flow from RDE 701 to TMA 707, the following signals are exchanged. RDE 701 provides to TMA 707 (i) 32-bit data signal rde_tma_data[31:0], which contains data and/or control dwords, (ii) 1-bit control signal rde_tma_soh, which is used to mark an SOH on $rde_{tma}$_data[31:0], and (iii) 1-bit control signal rde_tma_valid, which indicates whether signals rde_tma_data[31:0] and rde_tma_soh are valid. TMA 707 provides to RDE 701 1-bit control signal tma_rde_ready, which indicates whether RDE 701 is ready to accept rde_tma_data[31:0].

To control data flow from RDE 701 to MDC 705, the following signals are exchanged. RDE 701 provides to MDC 705 (i) 32-bit data signal rde_mdc_data[31:0], which contains data and/or control dwords, (ii) 1-bit control signal rde_mdc_soh, which is used to mark an SOH on rde_mdc_data[31:0], (iii) 1-bit control signal rde_mdc_valid, which is used to indicate whether signals rde_mdc_data[31:0] and rde_mdc_soh are valid, and (iv) 3-bit control signal rde_mdc_wdid[2:0], which provides the PDID for the disk in the array to which data is to be written. MDC 705 provides to RDE 701 8-bit data signal mdc_rde_ready[7:0], which indicates, for each disk in the array, whether MDG 705 is ready to accept rde_mdc_data[31:0].

To control data flow from MDC 705 to RDE 701, the following signals are exchanged. MDC 705 provides to RDE 701 (i) 32-bit data signal mdc_rde_data[31:0], which contains data and/or control dwords, (ii) 1-bit control signal mdc_rde_soh, which is used to mark an SOH on mdc_rde_data[31:0], (iii) 1-bit control signal mdc_rde_valid, which is used to indicate whether signals mdc_rde_data[31:0], mdc_rde_soh, and mdc_rde_rdid[2:0] are valid, and (iv) 3-bit control signal mdc_rde_rdid[2:0], which provides the PDID for the disk in the array from which a valid retrieval operation is taking place. RDE 701 provides to MDC 705 (i) 3-bit control signal rde_mdc_rdid[2:0], which indicates the requested PDID for a retrieval operation and (ii) 1-bit control signal rde_mdc_ready, which indicates that RDE 701 is ready to accept mdc_rde_data[31:0] from the drive indicated by rde_mdc_rdid[2:0].

To control data flow between RDE 701 and AAP 702, the following signals are exchanged. AAP 702 provides to RDE 701 (i) 32-bit data signal aap_hwdatad[31:0], which contains data being provided by AAP 702 to RDE 701 during a write operation to a register of RDE 701 stored in Control/Status Registers (CSR) 2108, (ii) 28-bit data signal aap_haddrd[27:0], which contains the address of a register in CSR 2108 specified by AAP 702 for the write operation, (iii) 2-bit data signal aap_htransd[1:0], which indicates the type of the current transfer and can be NONSEQUENTIAL, SEQUENTIAL, IDLE, or BUSY, (iv) 1-bit control signal aap_rde_hseld, which is a slave-select bit (each slave device on the AHB bus has its own slave select signal, and signal aap_rde_hseld indicates that the current transfer is intended for the selected slave), and (v) 1-bit control signal aaphwrited, which indicates whether the current operation is a read operation (aap_hwrited=0) or a write operation (aap_hwrited=1). RDE 701 provides to AAP 702 (i) 1-bit control signal rde_aap_hreadyd and (ii) rde_aap_hrespd, both of which are handshake control signals, (iii) 32-bit data signal rde_aap_hrdatad [31:0], which contains data being provided to AAP 702 from RDE 701 during a read operation from a register of RDE 701 stored in CSR 2108, (iv) 1-bit control signal rde_aap_inth, which is a high-priority interrupt request by RDE 701 to AAP 702, and (v) 1-bit control signal rde_aap_intl, which is a low-priority interrupt request by RDE 701 to AAP 702.

With reference to the timing diagram of FIG. 11, the transmission of data and control signals from TMA 707 to RDE 701 will now be discussed. Signal tma_rde_soh marks SOH control information that shares the TMA-to-RDE interface with data, and signal tma_rde_data[31:0] contains the control information and data. At transition 1, RDE 701 indicates that it is ready for a transfer from TMA 707 by assertion of rde_tma_ready. At transition 2 (after a fixed multi-cycle delay), TMA 707 (i) recognizes the ready status, (ii) asserts tma_rde_valid (if it has valid data to send), (iii) asserts tma_rde_soh, which marks SOH control information that shares the tma_rde_data[31:0] interface with data, and (iv) presents data/control information via signal tma_rde_data [31:0]. RDE 701 recognizes and accepts any valid data/control information. At transition 3, RDE 701 requests a pause by deassertion of rde_tma_ready. At transition 4 (after a fixed multi-cycle delay), information transfer pauses. At transition 5, RDE 701 indicates that it is ready to continue by assertion of rde_tma_ready. At transition 6 (after a fixed multi-cycle delay), the information transfer continues with the transmission of data on tma_rde_data[31:0] and the assertion of tma_rde_valid, and so forth.

It is noted that the number of cycles of tma_rde_valid assertion is less than or equal to the number of cycles for which signal rde_tma_ready was asserted. Signal tma_rde_valid is only asserted in a cycle-by-cycle response to an rde_tma_ready assertion, and the multi-cycle delay of the tma_rde_ valid response to rde_tma_ready is fixed.

Figures 13, 14:
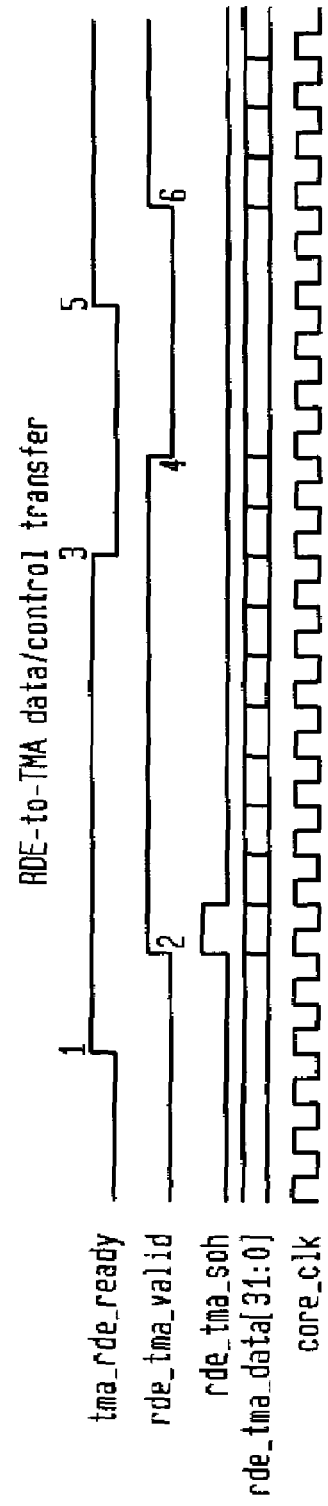
FIG. 13 is a frame-format diagram showing the format for tma_rde_data[31:0]
FIG. 14 is a timing diagram depicting the transmission of data and control signals from the RAID Encoder/Decoder (RDE) to the Traffic Manager/Arbiter (TMA)

FIG. 12 is a frame-format diagram showing the format for a tma_rde_data[31:0] storage-request frame, and FIG. 13 is a frame-format diagram showing the format for a tma_rde_data [31:0] retrieval-request frame. As shown, words 0 and 1 contain the same fields for both storage requests and retrieval requests. Word 0 includes the following fields. At bit [31], field T indicates the type of request, as instructed by TMA 707, and is 0 for a storage request (i.e., the data field contains data) and 1 for a retrieval request. At bits [30:24], field QID [6:0] is a queue identifier containing the QID for which the data is being retrieved or stored. At bits [23:20], field RAC [3:0] indicates which RAID-Array Cluster is to be operative for the transfer. At bits [19:4], field LENGTH[ 15:0] indicates the number of sectors of the contiguous length of the transfer (since sixteen bits are allocated to LENGTH, in units of sectors, transfers can be up to 64 k sectors, i.e., or 32 megabytes, in this embodiment). At bits [3:0] of word 0 and bits [31:0] of word 1, field DSA[35:0] indicates the DSA of the starting DSU to access. Words 2 through (LENGTH*128)+1 consist of field DATA[31:0], which contains the user data being transferred. The DATA[31:0] field is only present during a storage operation, i.e., if field T has a value of 0, and only words 0 and 1 are transmitted during a retrieval operation, i.e., if field T has a value of 1.

With reference to the timing diagram of FIG. 14, the transmission of data and control signals from RDE 701 to TMA 707 will now be discussed. Signal rde_tma_soh marks SOH control information that shares the RDE-to-TMA interface with data, and signal rde_tma_data[31:0] contains the control information and data. At transition 1, TMA 707 indicates that it is ready for a transfer from RDE 701 by assertion of tma_rde_ready. At transition 2 (after a fixed multi-cycle delay), RDE 701 (i) recognizes the ready status, (ii) asserts rde_tma_valid (if it has valid data to send), (iii) asserts rde_tma_ soh, which marks SOH control information that shares the rde_tma_data[31:0] interface with data, and (iv) presents data/control information via signal rde_tma_data[31:0]. TMA 707 recognizes and accepts any valid data/control information. At transition 3, TMA 707 requests a pause by deassertion of tma_rde_ready. At transition 4 (after a fixed multi-cycle delay), information transfer pauses. At transition 5, TMA 707 indicates that it is ready to continue by assertion of tma_rde_ready. At transition 6 (after a fixed multi-cycle delay), the information transfer continues with the transmission of data on rde_tma_data[31:0] and the assertion of rde_tma_valid, and so forth.

It is noted that the number of cycles of rde_tma_valid assertion is less than or equal to the number of cycles for which signal tma_rde_ready was asserted. Signal rde_tma_valid is only asserted in a cycle-by-cycle response to a tma_rde_ready assertion, and the multi-cycle delay of the rde_tma_valid response to tma_rde_ready is fixed.

The frame format for a tma_rde_data[31:0] storage-request frame is substantially the same as the frame format for an rde_tma_data[31:0] storage-request frame and is provided in FIG. 12. Likewise, the frame format for a tma_rde_data [31:0] retrieval-request frame is substantially the same as the frame format for an rde_tma_data[31:0] retrieval-request frame and is provided in FIG. 13.

With reference to the timing diagram of FIG. 15, the transmission of data and control signals from RDE 701 to MDC 705 will now be discussed. Signal rde_mdc_soh marks SOH control information that shares the RDE-to-MDC interface with data, and signal rde_mdc_data[31:0] contains the control information and data. At transition 1, RDE 701 specifies a PDID for the transfer via signal rde_mdc_wdid[2:0]. At transition 2 (after a fixed multi-cycle delay), MDC 705 indicates that its FIFO buffer corresponding to the selected PDID has space available by assertion of signal mdc_rde_ready[7: 0], whose bit mapping corresponds to the selected PDID. At transition 3 (after a fixed multi-cycle delay), RDE 701 (i) recognizes the ready status, (ii) asserts rde_mdc_valid (if it has valid data queued to send), (iii) asserts rde_mdc_soh, which marks SOH control information that shares the rde_mdc_data[31:0] interface with data, and (iv) presents data/control information via signal rde_mdc_data[31:0]. MDC 705 recognizes and accepts any valid data/control information and steers it with the address corresponding to the selected PDID identified by rde_mdc_wdid[2:0]. At transition 4, MDC 705 indicates, by deasserting the corresponding mapped bit of mdc_rde_ready[7:0], that its FIFO buffer corresponding to the selected PDID is almost full. At transition 5 (after a fixed multi-cycle delay), information transfer pauses. At transition 6 (after a fixed multi-cycle delay), RDE 701 specifies an alternate PDID on signal rde_mdc_wdid[2:0]. At transition 7, MDC 705 indicates, by assertion of mdc_rde_ready[7:0], that its FIFO buffer corresponding to the alternate PDID selected by rde_mdc_wdid[2:0] has space available. At transition 8 (after a fixed multi-cycle delay), the previously paused information transfer continues with the transmission of data on rde_mdc_data[31:0] and the assertion of rde_mdc_valid, and so forth.

It is noted that the number of cycles of rde_mdc_valid assertion is less than or equal to the number of cycles for which signal mdc_rde_ready[7:0] was asserted. Signal rde_mdc_valid is only asserted in a cycle-by-cycle response to a chosen mdc_rde_ready[7:0] assertion, and the multi-cycle delay of the rde_mdc_valid response to mdc_rde_ready [7:0] status is fixed.

To prevent blocking, when a PDID is selected for which an uncleared error-status bit is set in the Error-Status Registers (rRERR), which are discussed in further detail below, RDE 701 will regard the state of that corresponding bit of the ready (almost-full) status bus as being ready, regardless of its actual state.

FIG. 16 is a frame-format diagram showing the format for an rde_mdc_data[31:0] storage-request frame, and FIG. 17 is a frame-format diagram showing the format for an rde_mdc_data[31:0] retrieval-request frame. As shown, words 0, 1, and 2 contain the same fields for both storage requests and retrieval requests. Word 0 includes the following fields. At bit [31], field T indicates the type of request, as instructed by RDE 701, and is 0 for a storage request (i.e., the data field contains data) and 1 for a retrieval request. At bits [30:24], field QID[6:0] is a queue identifier containing the QID for which the data is being retrieved or stored. Bits [23:16] are not used in this embodiment. At bits [15:0], field XCNT[15:0] indicates the transfer count, in sectors. It should be noted that field XCNT[15:0] is not the same as the LENGTH[15:0] field of tma_rde_data[31:0]. LENGTH[15:0] is specified in units of data sectors and represents the data that is to be transferred between RDE 701 and TMA 707, which RDE 701 spreads over the entire array. The XCNT[15:0] field, on the other hand, is drive-specific and can include data and parity information that is not transferred between RDE 701 and TMA 707. Bits [31:15] of word 1 are not used in this embodiment. At bits [15:0] of word 1 and bits [31:0] of word 2, field LBA[47:0] indicates an LBA identifying the starting sector address for the storage or retrieval operation. Words 3 through (XCNT*128)+2 consist of field DATA[31:0], which contains the user data being transferred. The DATA[31:0] field is only present during a storage operation, i.e., if field T has a value of 0, and only words 0, 1, and 2 are transmitted during a retrieval operation, i.e., if field T has a value of 1.

With reference to the timing diagram of FIG. 18, the transmission of data and control signals from MDC 705 to RDE 701 will now be discussed. Signal mdc_rde_soh marks SOH control information that shares the MDC-to-RDE interface with data, and signal mdc_rde_data[31:0] contains the control information and data. At transition 1, RDE 701 indicates that it is ready for a transfer from MDC 705 by (i) specifying a requested PDID for the transfer via signal rde_mdc_rdid[2:0] and (ii) asserting signal rde_mdc_ready. At transition 2 (after a fixed multi-cycle delay), MDC 705 (i) recognizes the ready status, (ii) asserts mdc_rde_valid (if it has valid data queued to send), (iii) asserts mdc_rde_soh, which marks SOH control information that shares the mdc_rde_data[31:0] interface with data, (iv) presents data/control information via signal mdc_rde_data[31:0], and (v) specifies, via signal rde_mdc_rdid[2:0], the PDID of the drive from which the data/control information is being provided. RDE 701 recognizes and accepts any valid data/control information. At transition 3, RDE 701 indicates, by deasserting rde_mdc_ready, that its read-FIFO buffer (in read-FIFO buffers 3000 of RIF 2105) corresponding to the selected PDID is no longer ready to receive. At transition 4 (after a fixed multi-cycle delay), information transfer pauses. At transition 5 (after a fixed multi-cycle delay), RDE 701 (i) specifies a first alternate PDID on rde_mdc_rdid[2:0] and (ii) indicates it is ready to receive again by continued assertion of rde_mdc_ready. At transition 6 (after a fixed multi-cycle delay), the previously-paused information transfer continues, i.e., MDC 705 (i) recognizes the ready status, (ii) asserts mdc_rde_valid, (ii) presents data/control information via signal mdc_rde_data[31:0], and (iii) specifies, via signal rde_mdc_rdid[2:0], the PDID of the first alternate drive from which the data/control information is now being provided, and RDE 701 specifies a second alternate PDID on rde_mdc_rdid[2:0]. At transition 7 (after a fixed multi-cycle delay), information transfer continues from the second alternate PDID that was specified on rde_mdc_rdid [2:0], i.e., MDC 705 (i) presents data/control information via signal mdc_rde_data[31:0] and (ii) specifies, via signal rde_mdc_rdid[2:0], the PDID of the second alternate drive from which the data/control information is now being provided.

It is noted that the number of cycles of mdc_rde_valid assertion is less than or equal to the number of cycles for which signal rde_mdc_ready was asserted. Signal mdc_rde_valid is only asserted in a cycle-by-cycle response to a chosen rde_mdc_ready assertion, and the multi-cycle delay of the mdc_rde_valid response to rde_mdc_ready status is fixed.

FIG. 19 is a frame-format diagram showing the format for an mdc_rde_data[31:0] retrieval-response frame, and FIG. 20 is a frame-format diagram showing the format for an mdc_rde_data[31:0] storage-response frame. As shown, words 0, 1, and 2 contain the same fields for both retrieval-response frames and storage-response frames. Word 0 includes the following fields. At bit [31], field T indicates the type of request, as instructed by MDC 705, and is 0 for a storage request and 1 for a retrieval request (i.e., the data field contains data). At bits [30:24], field QID[6:0] is a queue identifier containing the QID for which the data is being retrieved or stored. At bit [23], field E indicates an error condition, which MDC 705 uses to terminate a retrieval operation. Bits [22:0] are not used in this embodiment. Words 1 through (XCNT*128) consist of field DATA[31:0], which contains the user data being transferred. The DATA[31:0] field is only present during a retrieval operation, i.e., if field T has a value of 1, and only word 0 is transmitted during a retrieval operation, i.e., if field T has a value of 0.

Internal RDE Structure

Figure 21:
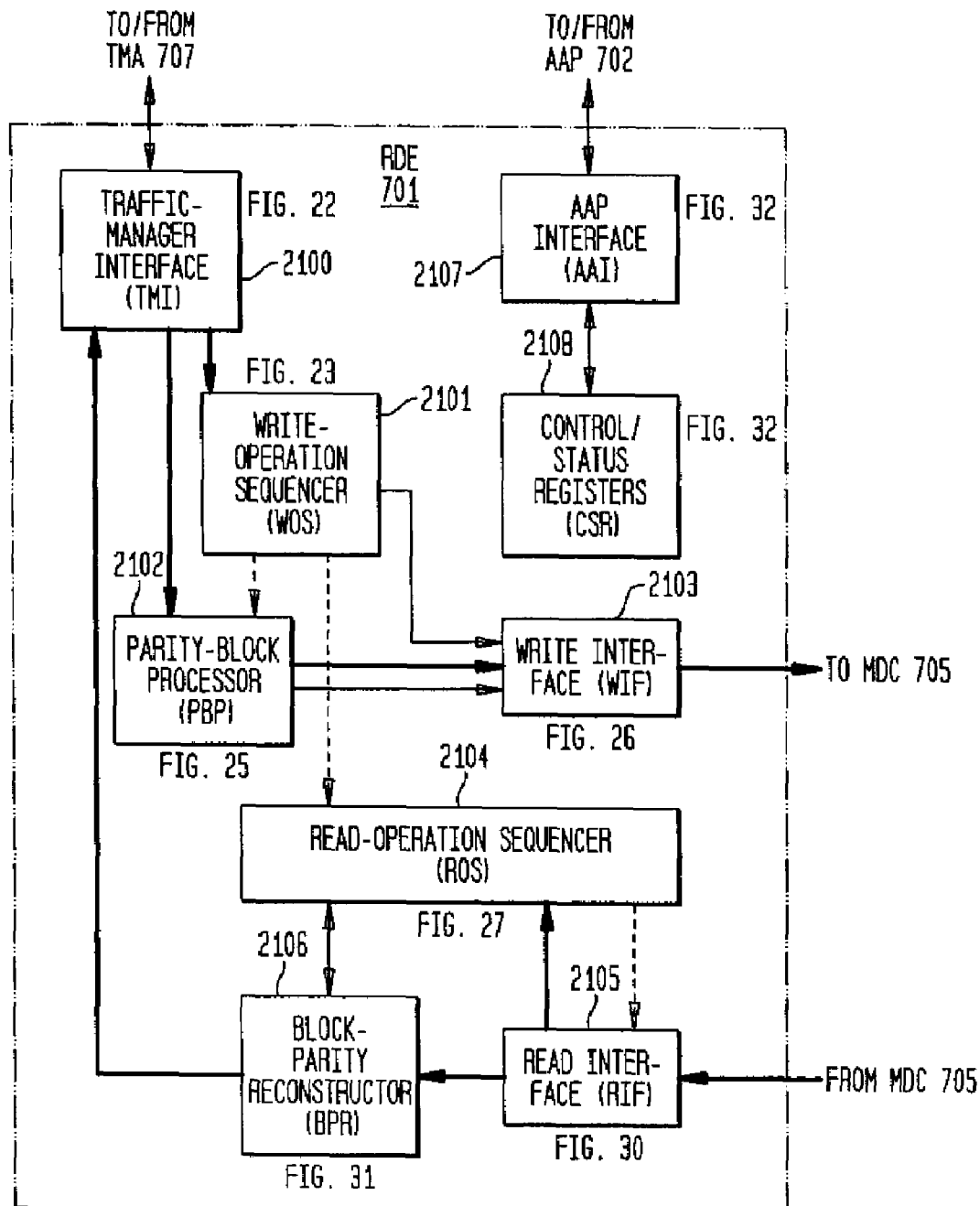
FIG. 21 is a block diagram showing the internal sub-blocks of RAID Encoder/Decoder (RDE) of FIG. 7.

FIG. 21 is a block diagram showing the internal sub-blocks of RDE 701 and data flow within RDE 701, in one embodiment of the invention. As shown, the sub-blocks of RDE 701 include Traffic-Manager Interface (TMI) 2100, Write-Operation Sequencer (WOS) 2101, Parity-Block Processor (PBP) 2102, Write Interface (WIF) 2103, Read-Operation Sequencer (ROS) 2104, Read Interface (RIF) 2105, Block-Parity Reconstructor (BPR) 2106, AAP Interface (AAI) 2107, and Control/Status Registers (CSR) 2108.

While not specifically shown in FIG. 21 as coupled to other sub-blocks of RDE 701, AAP interface (AAI) 2107 is common to all of the sub-blocks of RDE 701 and exchanges data and control signals between AAP 702 and the various sub-blocks of RDE 701. AAI 2107 also provides access to CSR 2108, which are memory-mapped processor-accessible registers and memories that are used by the various sub-blocks of RDE 701.

As shown in FIG. 21, an overview of the top-level data and control flow is as follows. Requests for data transfers, including both storage and retrieval, are pulled as frames from TMA 707 through TMI 2100. The TMI-TMA interface handshake is flow-control provisioned.

As discussed above, an SOH marks the first dword of header information that begins each request frame. For retrieval, only header information is present, but for storage, data to be stored follows header information. Both types of headers generally share the same format, undergo the same translations, and trace the same route towards MDC 705.

Translated header information is conveyed to WIF 2103 for distribution and to PBP 2102 for initialization.

Data to be stored in shared memory 711 passes from TMI 2100 through PBP 2102 to WIF 2103, which passes the data to MDC 705 for storage on drives 712 of the array.

PBP 2102 performs block-parity generation on sectors from file-system chunks and maps data and parity to SSUs. WIF 2103 provides FIFO-buffering and an interface for demultiplexing to disk drives 712 in the array. WOS 2101 copies storage and retrieval requests to (Issued-Request FIFO (IRF) 2700 of) ROS 2104, while WIF 2103 writes to FIFOs of MDC 705 that correspond to disk drives 712.

ROS 2104 awaits completion of issued requests of which ROS 2104 was notified by WOS 2101.

Data read from response FIFOs of MDC 705 passes through RIF 2105 to BPR 2106, for transfer to TMA 707 through TMI 2100.

BPR 2106 reconstructs missing data for a degraded array using intact striped data and parity information.

System 700 desirably supports eight simultaneous High-Definition Television (HDTV) channels of 20 Mbits/second each, for an aggregate bandwidth of 160 Mbits/second. Network controller 703 desirably supports traffic up to 1 gigabit/second in each direction. Accordingly, RDE 701 is desirably capable of providing enough bandwidth to saturate the interface between RDE 701 and network controller 703. Each of hard drives 712 is desirably a SATA drive capable of interface-transfer rates of 150 Megabytes/second. For a RAID-5 array of N disk drives, the aggregate interface-transfer rate is thus (N−1)*150 Megabytes/second, or from 300 Megabytes/second (for a 3-drive array) to 1050 Megabytes/second (for an 8-drive array). This interface-transfer rate is an upper bound to the capability of drives 712. A 32-bit wide path interface enters RIF 2105, and a 32-bit wide path interface exits RIF 2105. Likewise, a 32-bit wide path interface enters WIF 2103, and a 32-bit wide path interface exits WIF 2103. At 125 mHz (disregarding flow control), these interfaces therefore each should have an upper limit of 4000 Mbits/second, for an aggregate upper limit of eight gigabits/second. A 32-bit wide read-path interface enters TMI 2100, and a 32-bit wide read-path interface exits TMI 2100. Likewise, a 32-bit wide write-path interface enters TMI 2100, and a 32-bit wide write-path interface exits TMI 2100. At 125 mHz (disregarding flow-control), these interfaces therefore each should have an upper limit of 4000 Mbits/second, for an aggregate upper limit of eight gigabits/second. TMA 707 desirably has an upper limit of 1.26 gigabits/second bandwidth that it can devote to its interface with RDE 701 in each direction.

Figure 22:
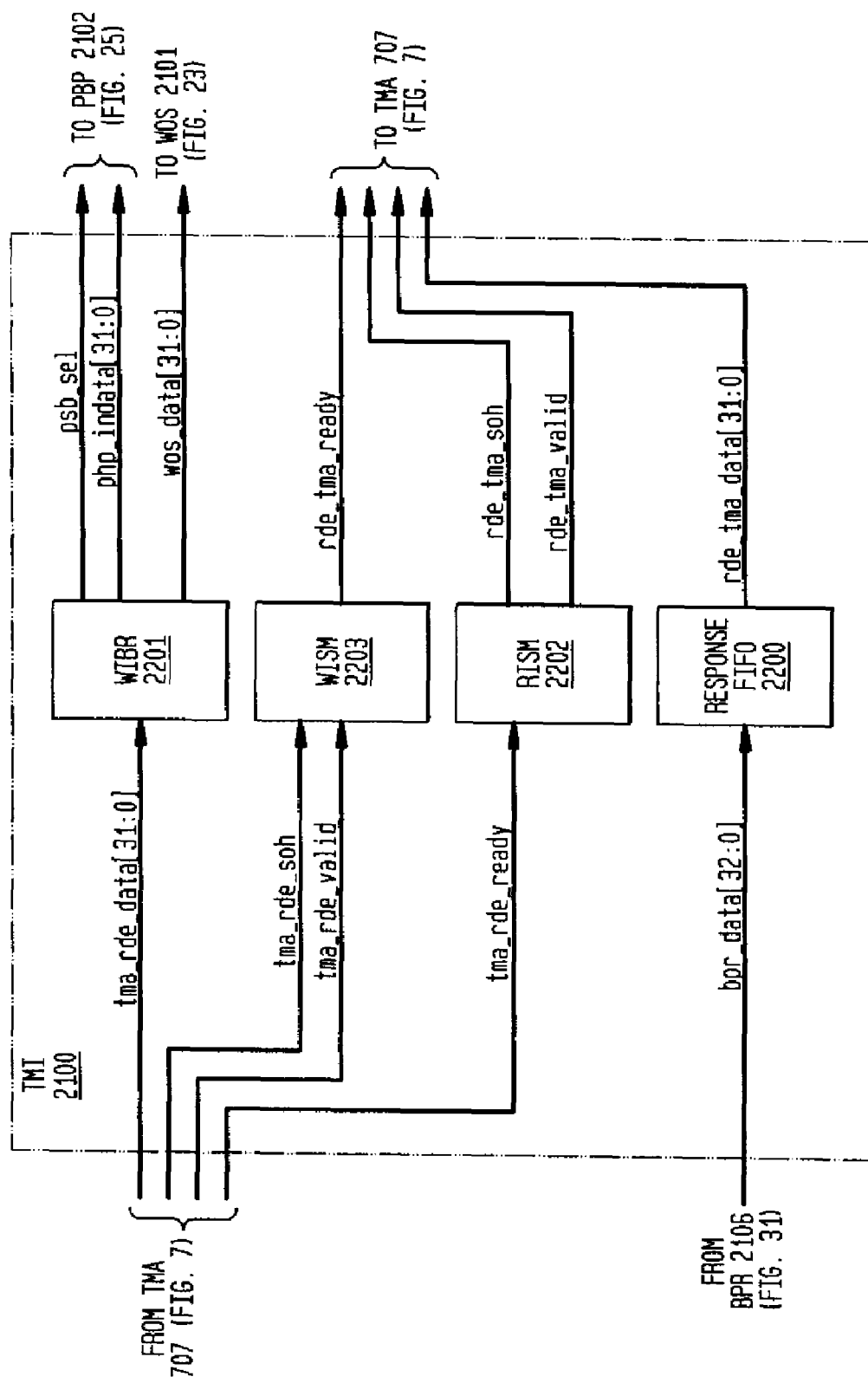
FIG. 22 is a block diagram of the Traffic-Manager Interface (TMI) sub-block of the RAID Encoder/Decoder (RDE) of FIG. 21.

FIG. 22 illustrates Traffic-Manager Interface (TMI) sub-block 2100 of RDE 701. As shown, TMI includes response FIFO 2200 (e.g., a 2 k×33-bit FIFO), Write-Information Buffer Registers (WIBR) 2201, Read-Interface State Machine (RISM) 2202, and Write-Interface State Machine (WISM) 2203. TMI 2100 interfaces to TMA 707, which controls access to shared memory 711 of AAP 702. In the read path, in response to demands from TMA 707, response FIFO 2200 receives data from BPR 2106 on 33-bit data signal bpr_data[32:0], and data is read out of response FIFO 2200 to TMA 707 on 32-bit data signal rde_tma_data[31:0], as controlled by RISM 2202. In the write path, in response to demands from TMA 707, WIBR 2201 receives data from TMA 707 on 32-bit data signal tma_rde_data[31:0], and data is read out of WIBR 2201 to PBP 2102 (for parity generation) on 32-bit data signal pbp_indata[31:0], as controlled by WISM 2203. WIBR 2201 also provides to PBP 2102 control signal psb_sel, which determines whether (i) an SSU arriving at PBP 2102 via pbp_indata[31:0] will pass through PBP 2102 and be provided to WIF 2103 normally (in non-degraded mode), or instead, (ii) PBP 2102 will generate and output accumulated parity information to WIF 2103 (in degraded mode), rather than the arriving SSU. Handshaking between RDE 701 and TMA 707 is implemented in TMI 2100 by RISM 2202 and WISM 2203, as described above, via signals (i) rde_tma_valid, provided by RISM 2202 to TMA 707, (ii) tma_rde_ready, provided by TMA 707 to RISM 2202, (iii) rde_tma_ready, provided by WISM 2203 to TMA 707, and (iv) tma_rde_valid, provided by TMA 707 to WISM 2203. Additionally, RISM 2202 provides SOH signal rde_tma_soh to TMA 707, and TMA 707 provides SOH signal tma_rde_soh to WISM 2203. WIBR 2201 also provides header information to WOS 2101 on 32-bit data signal wos_data[31:0] for storage in Write-Header Extraction Registers (WHER) 2301.

Figure 23:
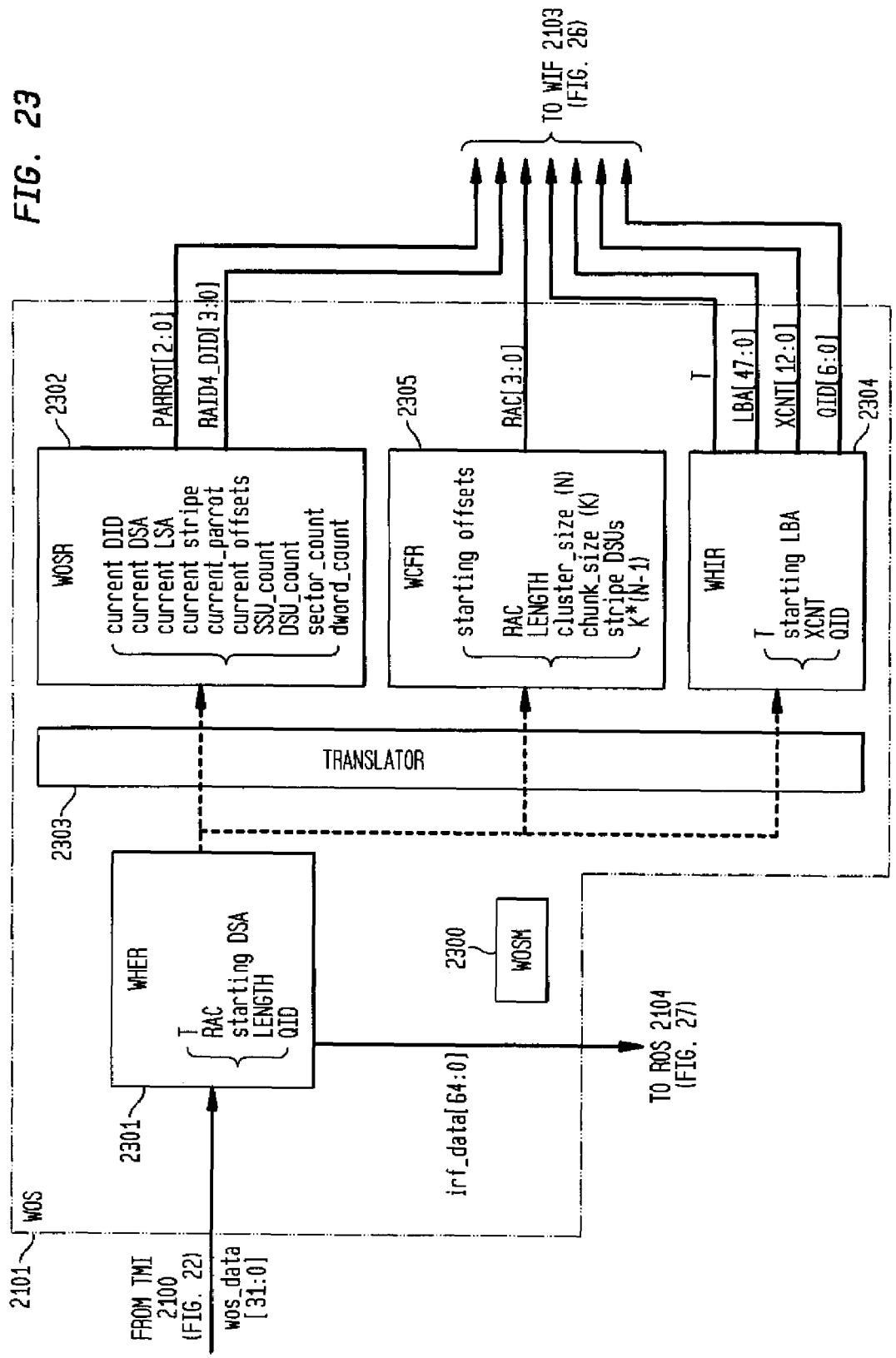
FIG. 23 is a block diagram of the Write-Operation Sequencer (WOS) sub-block of the RAID Encoder/Decoder (RDE) of FIG. 21.

FIG. 23 illustrates Write-Operation Sequencer (WOS) sub-block 2101 of RDE 701. As shown, WOS 2101 includes Write-Operation State Machine (WOSM) 2300, Write-Header Extraction Registers (WHER) 2301, Write-Operation State Registers (WOSR) 2302, translator 2303, Write-Header Information Registers (WHIR) 2304, and Write-Request Configuration Registers (WCFR) 2305. For write requests, storage-request frames (shown in FIG. 12) and retrieval-request frames (shown in FIG. 13) are drawn into WIBR 2201 of TMI 2100 upon demand by WOSM 2300. It is noted that the information stored in many of these registers changes quickly, i.e., as each SSU is written to disks 712.

WHER 2301 stores header information (e.g., T, RAC, starting_DSA, LENGTH, and QID) received from TMI 2100 via signal wos_data[31:0], identified by a valid SOH assertion via signal tma_rde_soh.

WOSR 2302 stores various information received from translator 2303 and maintains various counts, including, e.g., the current DID (RAID4_DID), current DSA (DSA), current LBA (LBA), current stripe index (STRIPE), current parity rotation (PARROT), current offsets (STRIPE_SSU_OFFSET, STRIPE_DSU_OFFSET, SSU_DSU_OFFSET), current SSU count, current DSU count, current sector count, and current dword count.

WCFR 2305 stores various information received from translator 2303, including, e.g., starting offsets (starting_STRIPE, starting_SSU_DSU_OFFSET, starting_STRIPE_DSU_OFFSET, starting_STRIPE_SSU_OFFSET, and starting_SSU_OF_STRIPE), the RAC of the operative RAID cluster profile, transfer length LENGTH, cluster size N, chunk size K, and number of DSUs per stripe (K*(N−1)).

WHIR 2304 stores various information received from translator 2303, including, e.g., T, the starting LBA, transfer count XCNT, and current QID.

It should be understood that not all of the foregoing information stored in the registers of WOS 2101 is used in all embodiments of the present invention, and that other information not specifically mentioned herein could alternatively or additionally be stored in these registers.

Translator 2303 calculates, for each stripe being written to disks 712, the LBA corresponding to a provided DSA, using the LBA=DSA/(N−1) relationship described above. In addition to the LBA, the offset SSU_DSU_OFFSET is obtained using the SSU_DSU_OFFSET=DSA mod (N−1) relationship described above, and the offset STRIPE_DSU_OFFSET is obtained using the STRIPE_DSU_OFFSET=DSA mod (K*(N−1)) relationship described above. The Parity-Rotation Index is also obtained, using the PARROT=STRIPE mod N relationship described above. The transfer length (LENGTH) is distributed across the RAID cluster and is adjusted for any SSU offset. When the translations have been completed, the translated information (with the header information provided in the header formats shown in FIG. 16 and FIG. 17) is loaded into registers WHIR 2304 and WCFR 2305.

For storage requests, WOSM 2300 initializes the state registers of WOSR 2302 with state information derived from the starting DSA at which storage is to begin (starting_DSA). Header and configuration information is pulled through PBP 2102 into Pending-Write Request FIFO (WPF) 2603 of WIF 2103, for all drives in the referenced RAID-Array Cluster. WOS 2101 maintains a dword count, and WISM 2203 of TMI 2100 advances through sectors as stripes are completed, under control by WOSM 2300.

For retrieval requests, there is no data associated in the write path. However, header and configuration information is pulled through PBP 2102, for all drives in the referenced RAID-Array Cluster, into WPF 2603 of WIF 2103 and into IRF 2700 of ROS 2104.

Header information from the contents of register WHER 2301 (T, RAC, starting_DSA, LENGTH, and QID) is provided via data signal irf_data[64:0] to IRF 2700 of ROS 2104.

During degraded-mode operation, storage and retrieval requests targeted for the degraded drive are not entered into WPF 2603 of WIF 2103. Logical-Drive Identifier RAID4_DID_ldeg of the degraded drive is derived from the value stored in the ldeg[9:7] bits of the operative VAP stored in one of RAC Profile Registers 0-15 (rRAC0-rRAC15, discussed in further detail with respect to Tables 21 and 22 below), and the PARROT from WCFR 2305. For the write path, all writes to WPF 2603 of WIF 2103 are inhibited when (i) the value stored in the degraded[6] bit of the corresponding VAP stored in one of rRAC0-rRAC 1 5 is TRUE, and (ii) the value read from ldeg[9:7] of the corresponding VAP stored in one of rRAC0-rRAC15 matches the RAID5_DID obtained by presenting the RAID4_DID to PARROT DID Map 2601 of WIF 2103.

If the tail end of a storage request, as determined by the LENGTH plus SSU_DSU_OFFSET intersects an SSU, the remaining sectors of the SSU are written with zeros.

WIF 2103 reads various values out of the registers of WOS 2101, including the following. The current PARROT (PARROT[2:0]) and RAID4_DID[3:0] are read from WOSR 2302, the indicator for the operative RAID-Array Cluster RAC[3:0] is read from WCFR 2305, and header information T, LBA [47:0], XCNT[12:0], and QID[6:0] are read from WHIR 2304.

Figure 24:
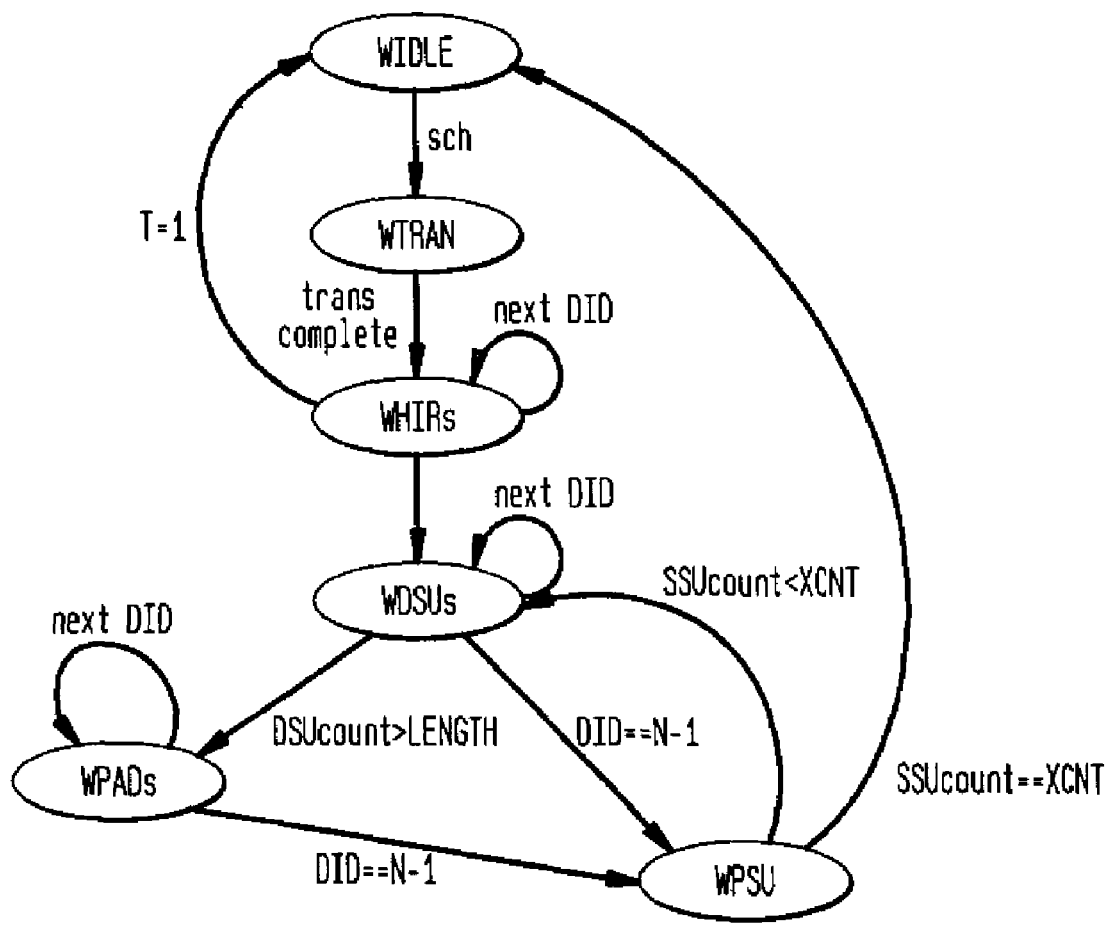
FIG. 24 is a state diagram depicting the operation of the Write-Operation State Machine (WOSM) of FIG. 23.

With reference to the state diagram of FIG. 24, the operation of WOSM 2300 will now be described.

The Write-Idle (WIDLE) state is the initial idle or ready-resting state while waiting for an SOH to be asserted, at which point WOSM 2300 transitions to the Write-Translate (WTRAN) state. In the WTRAN state, header information extracted from a request header received from TMA 707 is copied, manipulated, and translated to initialize the WHER 2301, WOSR 2302, WCFR 2305, and WHIR 2304 register sets, and an entry is written to IRF 2700 of ROS 2104, after which WOSM 2300 transitions to the Write Header-Information Requests (WHIRs) state.

In the WHIRs state, translated header information is written to WPF 2603 of WIF 2103, for each drive of the operative RAID-Array Cluster Profile, after which WOSM 2300 transitions to the Write DSUs (WDSUs) state. If field T has a value of 1, i.e., a retrieval operation is taking place, then WOSM 2300 transitions to the WIDLE state to wait for another SOH.

In the WDSUs state, DSUs are presented in arrival sequence (RAID4_DID<N−1) to WPF 2603 of WIF 2103, for each drive of the operative RAID-Array Cluster Profile. If the current DSU count is greater than LENGTH, then WOSM 2300 transitions to the Write Padded Sectors (WPADs) state, and if the drive identification count reaches N−1, then WOSM 2300 transitions to the Write PSU (WPSU) state.

In the WPADs state, zero-padded sectors are presented sequentially (RAID4_DID<N−1) to WPF 2603 for each drive of the operative RAID-Array Cluster Profile. If the current drive identifier reaches N−1, then WOSM 2300 transitions to the WPSU state.

In the WPSU state, the PSU (RAID4_DID==N−1) is presented to WPF 2603. If the current SSU count is less than XCNT, then WOSM 2300 transitions to the WDSUs state, and if the current SSU count reaches XCNT, then WOSM 2300 transitions to the WIDLE state.

In the WDSUs, WPADs, and WPSU states, sectors destined for degraded drives (i.e., when (i) the value stored in the degraded[6] bit of the corresponding profile stored in one of rRAC0-rRAC15 is TRUE, and (ii) the value read from ldeg [9:7] of the corresponding VAP stored in one of rRAC0-rRAC15 matches the RAID5_DID obtained by presenting the RAID4_DID to PARROT DID Map 2601 of WIF 2103) are blanked, i.e., these sectors are not loaded into WPF 2603.

Figure 25:
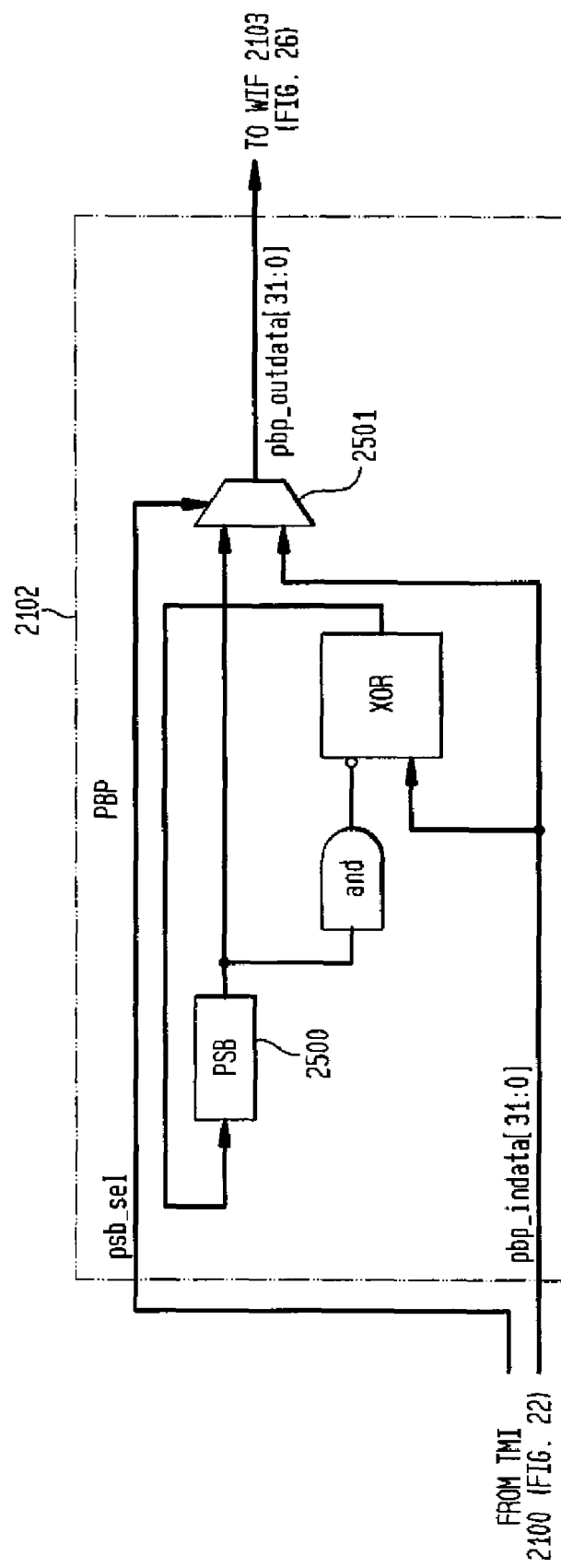
FIG. 25 is a block diagram of the Parity-Block Processor (PBP) sub-block of the RAID Encoder/Decoder (RDE) of FIG. 21.

FIG. 25 illustrates Parity-Block Processor (PBP) sub-block 2102 of RDE 701. PBP 2102 performs block-parity generation on SSU sector data received from WIBR 2201 of TMI 2100, as directed by WOSM 2300 of WOS 2101. Instead of storing parity information for each SSU sector (as in traditional RAID array systems), which would require substantial overhead in terms of memory and time, PBP 2102 accumulates parity information in a single buffer, i.e., Parity-Sector Buffer (PSB) 2500 (e.g., a 128×32-bit RAM with separate read and write ports). As the first sector of an SSU flows to WIF 2103, this sector is also copied to PSB 2500. As subsequent sectors flow through to WIF 2103, the contents of PSB 2500 are replaced with the XOR of (i) its previous contents and (ii) the arriving SSU sector data, thereby accumulating parity information in PSB 2500. When N−1 sector units have been transferred, PSB 2500 is transferred and cleared. Signal psb_sel received from WIBR 2201 of TMI 2100 controls multiplexer 2501, thereby determining whether (i) an SSU arriving at PBP 2102 via pbp_indata[31:0] will pass through PBP 2102 and be provided as pbp_outdata[31:0] to WIF 2103 normally (in non-degraded mode), or instead, (ii) PBP 2102 will generate and output as pbp_outdata[31:0] accumulated parity information to WIF 2103 (in degraded mode), rather than the arriving SSU.

Figure 26:
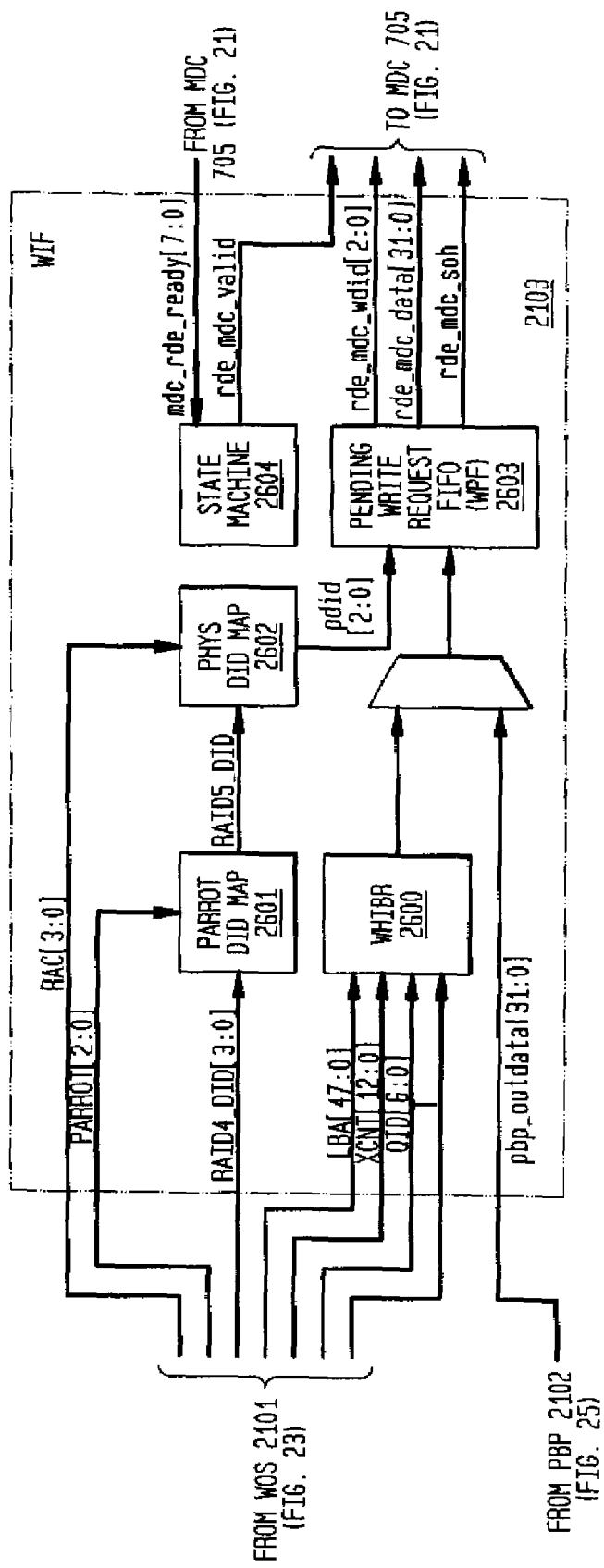
FIG. 26 is a block diagram of the Write-Interface (WIF) sub-block of the RAID Encoder/Decoder (RDE) of FIG. 21.

FIG. 26 illustrates Write-Interface (WIF) sub-block 2103 of RDE 701. WIF 2103 includes Write-Header Information-Buffer Register (WHIBR) 2600, PARROT DID Map 2601, PHYS DID Map 2602, Pending-Write Request FIFO (WPF) 2603, and state machine 2604. WIF 2103 buffers requests for storage and retrieval operations and communicates those requests to MDC 705. Write operations are executed as commanded by WOS 2101 and, as these requests are written to WPF 2603 (e.g., a 2 k×36-bit FIFO) and then sent to MDC 705, information is also written by WOS 2101 to IRF 2700 of ROS 2104. WHIBR 2600 holds header information to be multiplexed with storage request data. Accordingly, WHIBR 2600 receives from WHIR 2304 of WOS 2101 header information including LBA[47:0], XCNT[12:0], QID[6:0], and T. This header information (as shown in FIG. 16 and FIG. 17) is written for each drive in the RAID-Array Cluster once per storage or retrieval request.

WIF 2103 performs RAC mapping from Logical-Drive Identifier to Physical-Drive Identifier upon demand by WOS 2101. Accordingly, PARROT DID Map 2601 receives the stripe's Parity-Rotation Index PARROT[2:0] and Logical-Drive Identifier RAID4_DID[3:0] from WOSR 2302 of WOS 2101, and PHYS DID Map 2602 receives the selected RAID-Array Cluster registers RAC[3:0] from WCFR 2305 of WOS 2101. Parity rotation is accomplished by simply using PARROT DID Map 2601 to map RAID4_DID[3:0] to the parity-rotated Logical-Drive Identifier (RAID5_DID) using PARROT[2:0]. PHYS DID Map 2602 handles mapping of a parity-rotated logical disk array drive number (RAID5_DID) to a physical drive number (PDID), which is performed using the operative VAP stored in one of RAC Profile Registers 0-15 (rRACMAP0-rRACMAP15, discussed in further detail with respect to Tables 23 and 24 below) identified by RAC[3:0].

The drive identifier pdid[2:0], along with header information from WHIBR 2600 multiplexed with storage request data received from WIBR 2201 of TMI 2100 via PBP 2102 are provided to WPF 2603 for storage. WPF 2603 provides to MDC 705 (i) the current drive identifier via signal rde_mdc_wdid[2:0], (ii) the multiplexed header and data via signal rde_mdc_data[31:0], and (iii) SOH signal rde_mdc_soh. State machine 2604 unloads WPF 2603 and executes a write-interface handshake with MDC 705 via the mdc_rde_ready [7:0] signal and the rde_mdc_valid signal. The rde_mdc_valid signal is deasserted when WPF 2603 has been emptied, when a new physical DID is to be presented via signal rde_mdc_wdid[2:0], or when the sampled signal mdc_rde_ready[7:0] indicates that MDC 705 is not ready.

Figure 27:
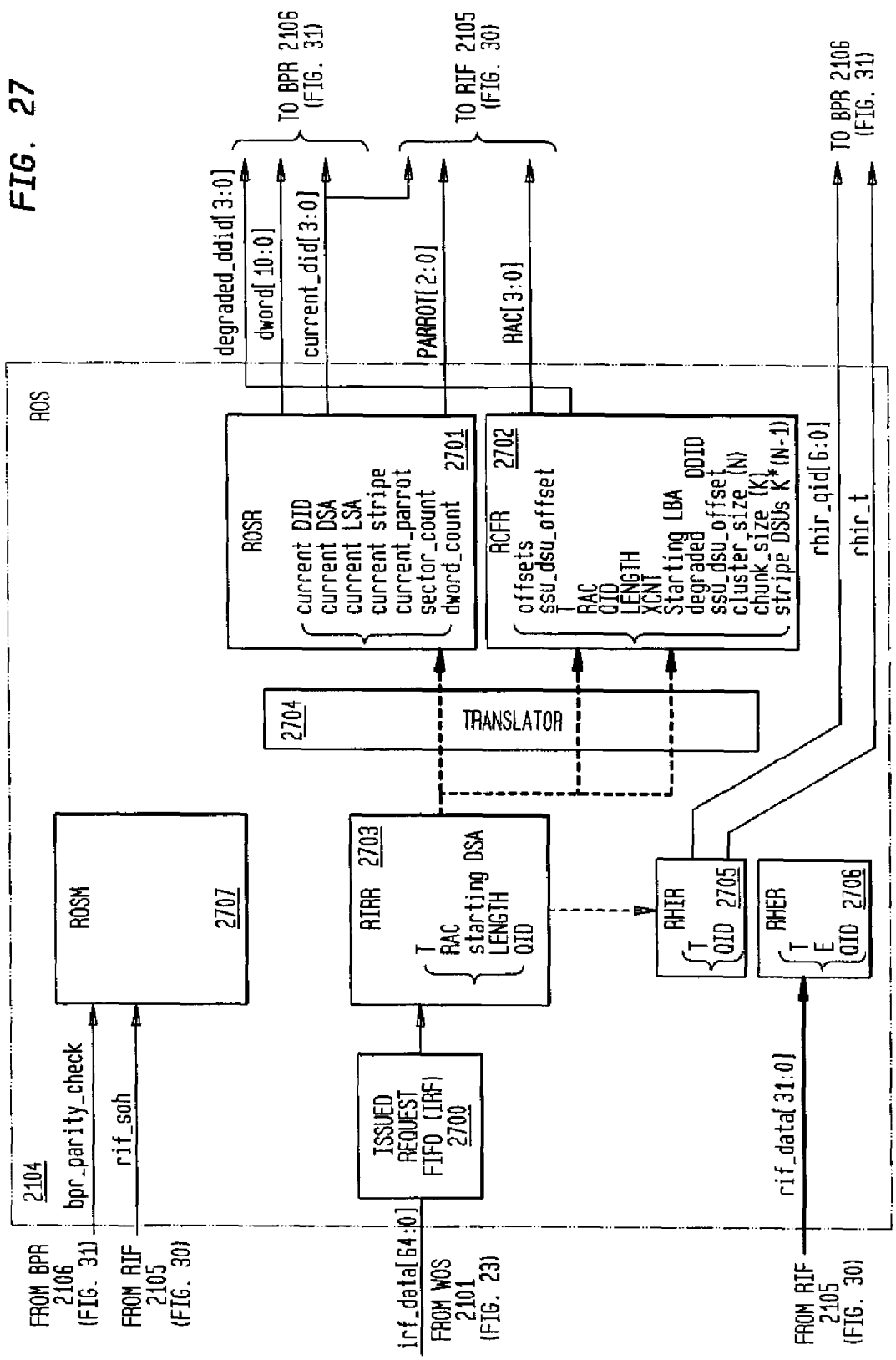
FIG. 27 is a block diagram of the Read-Operation Sequencer (ROS) sub-block of the RAID Encoder/Decoder (RDE) of FIG. 21.
Figure 28:
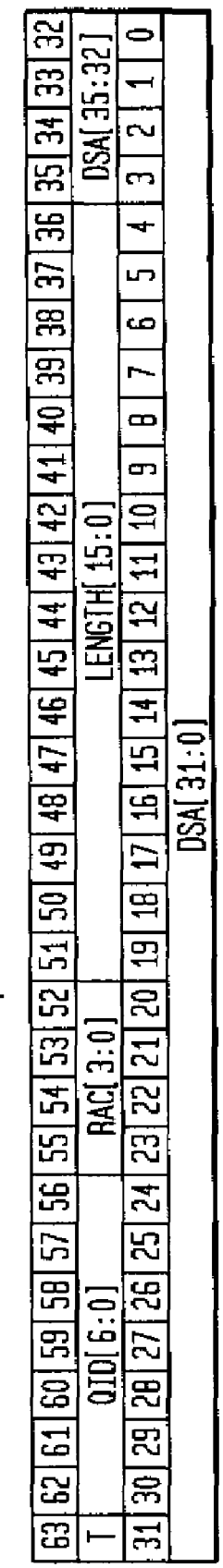
FIG. 28 is a frame-format diagram showing the format for an Issued-Request FIFO (IRF) frame.

FIG. 27 illustrates the Read-Operation Sequencer (ROS) sub-block 2104 of RDE 701. ROS 2104 includes Issued-Request FIFO (IRF) 2700, Read-Operation State Registers (ROSR) 2701, Read-Response Configuration Registers (RCFR) 2702, Request-Information Response Registers (RIRR) 2703, translator 2704, Response-Header Information Register (RHIR) 2705, Response-Header Error Register (RHER) 2706, and Read-Operation State Machine (ROSM) 2707. IRF 2700 (e.g., a 64×64-bit FIFO) receives header information (as shown in FIG. 28, described below) via data signal irf_data[64:0] from WHER 2301 of WOS 2101, which ROS 2104 uses to monitor and confirm responses to issued requests. It is noted that the information stored in many of these registers changes quickly, i.e., as each SSU is being read from disks 712.

RIRR 2703 stores header information (e.g., T, RAC, starting_DSA, LENGTH, and QID) received from IRF 2700. Registers ROSR 2701 and RCFR 2702 are initialized from this header information.

ROSR 2701 stores various information received from translator 2704 and maintains various counts, including, e.g., the current DID (current_did), current DSA (DSA), current LBA (LBA), current stripe index (STRIPE), current parity rotation (PARROT), current sector count, and current dword count.

RCFR 2702 stores various information received from translator 2704, including, e.g., offsets (SSU_DSU_OFFSET, STRIPE_DSU_OFFSET, and STRIPE_SSU_OFFSET), T, the operative RAID cluster profile RAC, QID, transfer length LENGTH, transfer count XCNT, starting LBA, degraded DDID, cluster size N, chunk size K, and number of DSUs per stripe (K*(N−1)).

RHIR 2705 stores various information read out of RIRR 2703, including, e.g., T and the current QID.

RHER 2706 stores various retrieval-response information received from RIF 2105 on rif_data[31:0], including T, the current QID, and error bit E.

It should be understood that not all of the foregoing information stored in the registers of ROS 2104 is used in all embodiments of the present invention, and that other information not specifically mentioned herein could alternatively or additionally stored in these registers.

Translator 2704 reads out of RIRR 2703 header information (i.e., T, RAC, starting_DSA, LENGTH, and QID, as stored in register WHER 2301) to perform, for each stripe being read from disks 712, substantially the same calculations (described above) that translator 2303 performs for DSA translations in the write path using WHER 2301 of WOS 2101. When the translations have been completed, the translated information is loaded into registers ROSR 2701 and RCFR 2702. Register RIRR 2703 also supplies the T and QID fields to register RHIR 2705, which provides this information to the Response-Header Information-Buffer Register block (RHIBR) of BPR 2106 via signals rhir_t and rhir_qid[6:0], respectively. Register RIER receives the T, E, and QID fields from the rif_data[31:0] stream provided by RIF 2105 and provides this information to ROSM 2707 in detecting response errors from MDC 705. ROSM 2707 receives signal bpr_parity_check from BPR 2106 and signal rif_soh from RIF 2105, which signals are used to generate state information, as will be described in further detail below.

BPR 2106 reads various other values out of the registers of ROS 2104, including the DDID of a degraded drive degraded_ddid[3:0], current dword[10:0], and DDID of the drive operative for the current transfer current_did[3:0] from ROSR 2701. RIF 2105 also reads various values out of the registers of ROS 2104, including current_did[3:0], PARROT (PARROT[2:0]), and the indicator for the operative RAID-Array Cluster RAC[3:0], all of which are read from RCFR 2702.

ROS 2104 performs error handling as follows. If a retrieval-response error condition (stored in register E of RHER 2706) is detected, then it is marked in the Error-Status Registers (rRERR), as discussed below with respect to Tables 1-5. If a VAP stored in one of RAC Profile Registers 0-15 (rRAC0-rRAC15, discussed in further detail with respect to Tables 21 and 22 below) indicates that MDC 705 has detected an error due to a degraded volume, then ROS 2104 "back-annotates" the operative RAID-Array Register profile (specified by wcfr_rac[3:0]) with the RAID5_DID corresponding to the degraded drive, the degraded[6] bit in register RCFR 2702 is set to indicate a degraded drive, and the check bit of the degraded register in the corresponding VAP stored in rRAC0-rRAC15 is cleared. Such back-annotation does not occur if the corresponding VAP already indicates the drive's degraded status. If a PDID is to be accessed by an alternate VAP for which an outstanding error-status bit has already been set in the rRERR register of the corresponding VAP (discussed in further detail below), then the RAC-profile degraded back-annotation will instead be executed for that alternate profile.

FIG. 28 is a frame-format diagram showing the format for an issued-request FIFO (IRF) frame received via signal irf_data[64:0]. Each frame includes the following fields. At bit [63], field T indicates the type of request, as instructed by TMA 707, and is 0 for a storage request (i.e., the data field contains data) and 1 for a retrieval request. At bits [62:56], field QID[6:0] is a queue identifier containing the QID for which the data is being retrieved or stored. At bits [55:52], field RAC[3:0] indicates which RAID-Array Cluster is to be operative for the transfer. At bits [51:36], field LENGTH[15:0] indicates the number of sectors of the contiguous length of the transfer. At bits [35:0], field DSA[35:0] indicates the DSA of the starting DSU to access.

Figure 29:
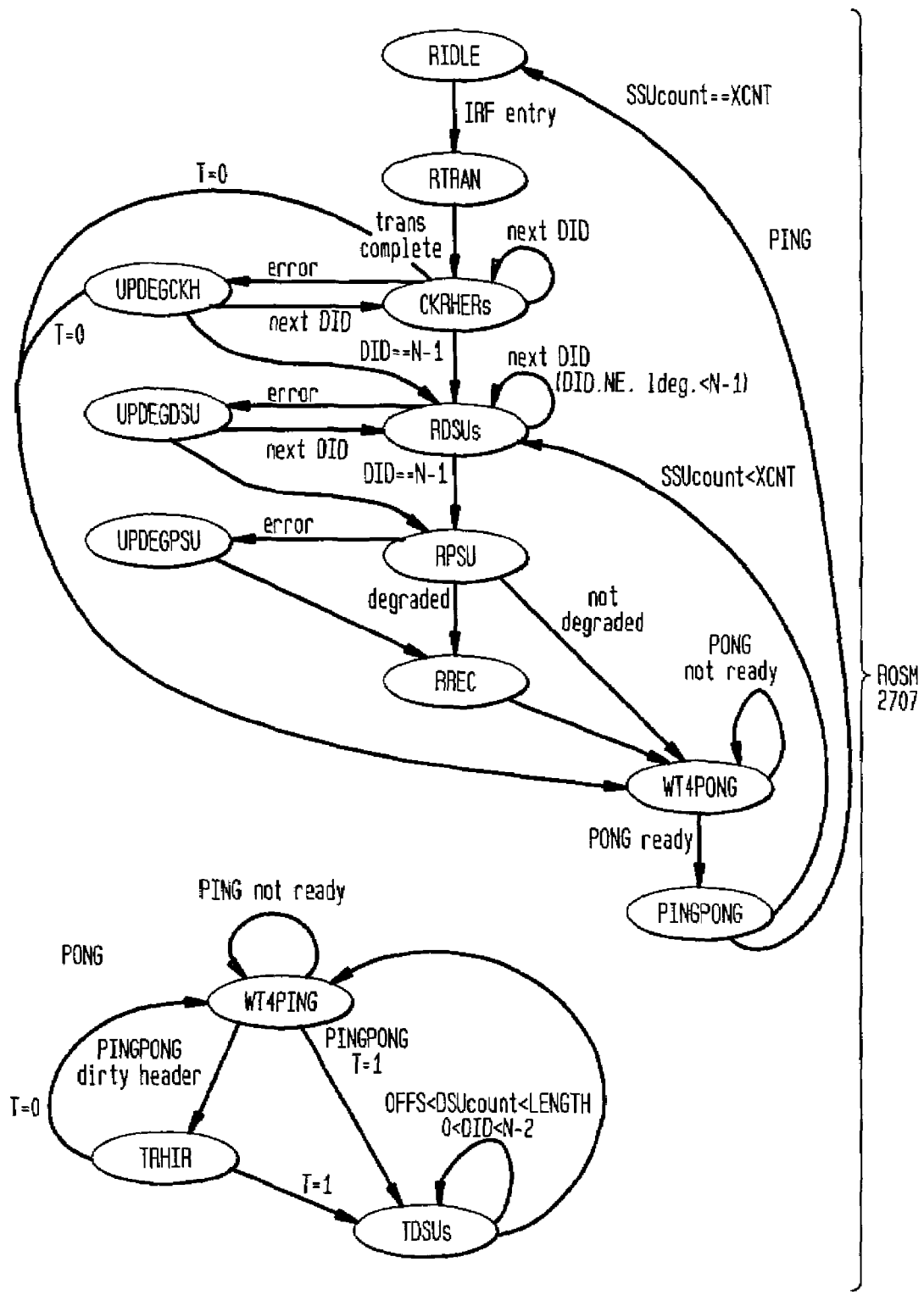
FIG. 29 is a state diagram depicting the operation of the Read-Operation State Machine (ROSM) of FIG. 27.

With reference to the state diagram of FIG. 29, the operation of ROSM 2707 will now be described. The PING states unload, into response FIFO 2200 of TMI 2100, (i) the contents of the primary buffer of SSUB 3101 of BPR 2106 and (ii) the contents of the primary Response-Header Information-Buffer Register (RHIBR) 3103 of BPR 2106. Concurrently, the PONG states unload, into response FIFO 2200 of TMI 2100, (i) the contents of the alternate buffer of SSUB 3101 of BPR 2106 and (ii) the contents of the alternate RHIBR 3103 of BPR 2106. ROSM 2707 can be referred to as a "ping-pong state machine" because the PING states and PONG states execute at the same time, thereby permitting concurrent use of two different RAID-Array Clusters (e.g., rebuilding a degraded volume on one RAC while retrieving multimedia data from a different RAC). The PING portion of the state machine "ping-pongs" the buffers of SSUB 3101 and RHIBR 3103, i.e., flips the primary-alternate buffer designations, when unloading of headers and data into response FIFO 2200 of TMI 2100 is complete and the PONG portion of the state machine is ready.

The PING portion of ROSM 2707 operates as follows.

The Read-Idle (RIDLE) state is the initial idle or ready-resting state while waiting for an IRF request header via irf_data[64:0] from WHER 2301 of WOS 2101 to arrive, at which point ROSM 2707 transitions to the Read-Translate (RTRAN) state.

In the RTRAN state, header information extracted from the IRF request header is copied, manipulated, and translated to initialize the RHER 2706, ROSR 2701, RCFR 2702, and RHIR 2705 register sets, after which ROSM 2707 transitions to the Check Response Headers (CKRHERs) state.

In the CKRHERs state, the response headers for non-degraded drives are pulled via rif_data[31:0] from RIF 2105, are matched with the issued request, and are checked for errors, for each drive of the operative RAID-Array Cluster Profile.

The Update Degraded from Check Response Headers (UPDEGCKR) state is entered from CKRHERs when the E field in a response header was set, indicating an MDC-response error (as shown in FIG. 20). The appropriate error-status bit is set in the rRERR registers (discussed in further detail below), and the operative VAP stored in one of RAC Profile Registers 0-15 (rRAC0-rRAC15, discussed in further detail with respect to Tables 21 and 22 below) is back-annotated, as may be appropriate (as discussed above).

In the Read DSUs (RDSUs) state, DSUs for non-degraded drives are pulled from RIF 2105 in RAID4_DID order (0<DID<N−2).

The Update Degraded from Read DSUs (UPDEGDSU) state is entered from state RDSUs when the E field in an unexpected response header was set, indicating an MDC-response error (as shown in FIG. 20). The appropriate error-status bit is set in the rRERR registers (discussed in further detail below), and the operative VAP stored in one of RAC Profile Registers 0-15 (rRAC0-rRAC15, discussed in further detail with respect to Tables 21 and 22 below) is back-annotated, as may be appropriate (as discussed above).

In the Read PSU (RPSU) state, the PSU for a non-degraded drive is pulled from RIF 2105 (RAID4_DID==(N−1)) and fed to the primary buffer of SSUB 3101. Parity checking is performed and status is updated, as may be necessary, in error-status registers rERR (which are discussed in further detail below).

The Update Degraded from Read PSU (UPDEGPSU) state is entered from state RDPSUs when the E field in an unexpected response header was set, indicating an MDC-response error (as shown in FIG. 20). The appropriate error-status bit is set in the rRERR registers (discussed in further detail below), and the operative VAP stored in one of RAC Profile Registers 0-15 (rRAC0-rRAC15, discussed in further detail with respect to Tables 21 and 22 below) is back-annotated, as may be appropriate (as discussed above).

In the Response-Reconstruct (RREC) state, the contents of Parity-Sector Buffer (PSB) 2500 of PBP 2102 are substituted for the degraded drive (RAID4_DID==RAID4_DID_ldeg) in the primary buffer of SSUB 3101.

In the Wait-for-Pong (WT4PONG) state, the primary ping-pong buffer of SSUB 3101 is ready, but the PING portion of ROSM 2707 is waiting for the PONG portion of ROSM 2707 to finish unloading the alternate ping-pong buffer of SSUB 3101.

In the Ping-Pong (PINGPONG) state, the primary and alternate ping-pong buffers of SSUB 3101 and RHIBR 3103 are ping-ponged, i.e., the primary and alternate buffer designations are switched.

The operation of the PONG portion of ROSM 2707 operates as follows.

The Wait-for-Ping (WT4PING) state is the initial idle or ready-resting state while waiting for PING. In this state, the PONG portion of ROSM 2707 is ready to feed the next alternate buffer contents of SSUB 3101 to response FIFO 2200 of TMI 2100. In other words, the PONG portion of ROSM 2707 is ready.

In the Transfer-Response Header-Information Buffer Register (TRHIR) state, a "dirty" (used) alternate RHIBR has been ping-ponged and is presented to response FIFO 2200 of TMI 2100. In this state, response headers for storage are not entered into response FIFO 2200 of TMI 2100.

In the Transfer DSUs (TDSUs) state, the alternate buffer of SSUB 3101 has been ping-ponged and is presented sector-by-sector to response FIFO 2200 of TMI 2100. In this state, DSUs are presented in order from 0 to N−2. Presented sector entries are only written to response FIFO 2200 of TMI 2100 when the current DSU count is past the SSU_DSU_OFFSET and also does not exceed the request LENGTH index.

Figure 30:
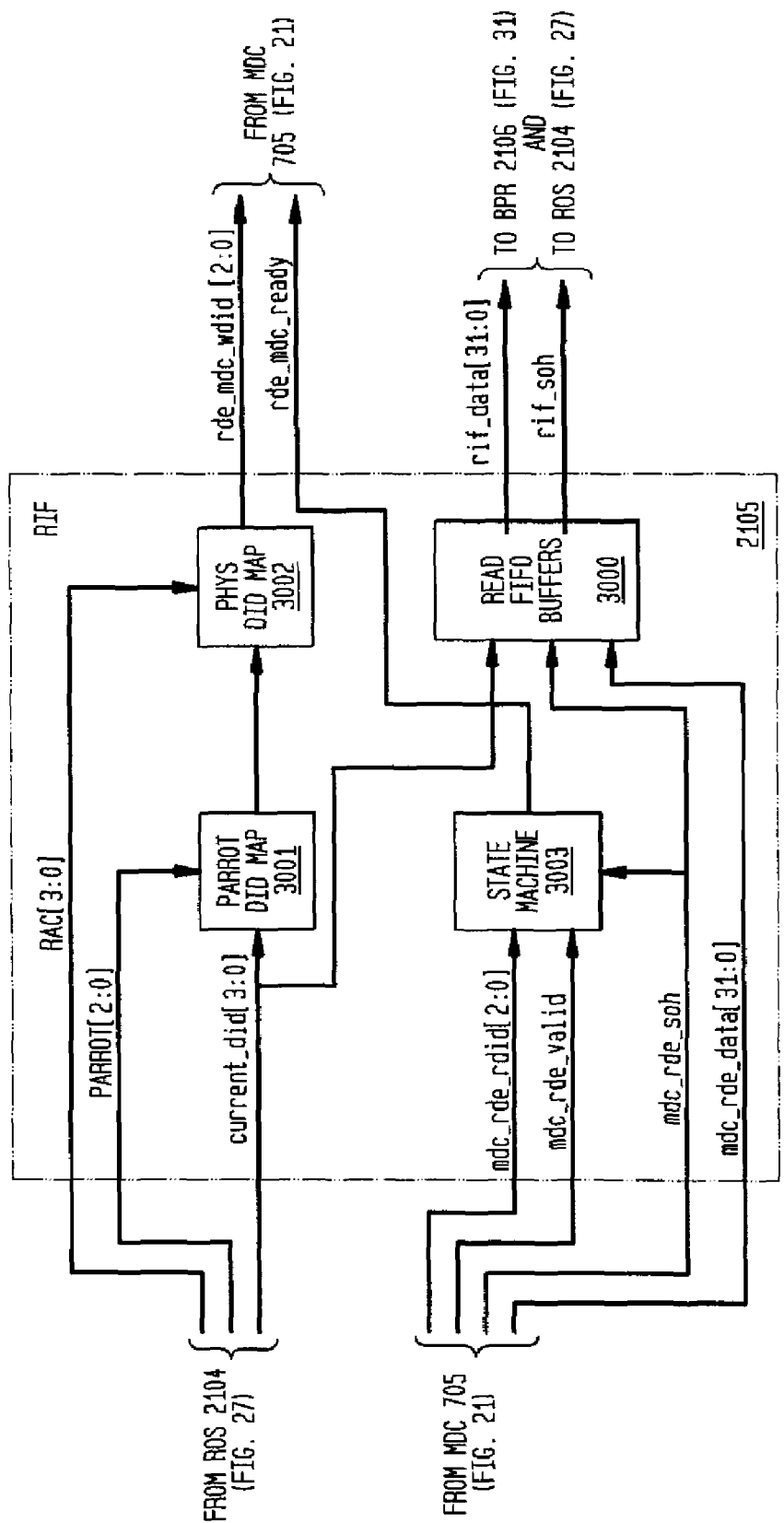
FIG. 30 is a block diagram of the Read-Interface (RIF) sub-block of the RAID Encoder/Decoder (RDE) of FIG. 21.

FIG. 30 illustrates Read-Interface (RIF) sub-block 2105 of RDE 701. RIF 2105 includes read-FIFO buffers 3000, PARROT DID Map 3001, PHYS DID Map 3002, and state machine 3003. RIF 2105 retrieves and buffers responses to issued requests described by header information from IRF 2700 of ROS 2104 and provides those responses to BPR 2106. Read-FIFO buffers 3000 receive from MDC 705 (i) SOH signal mdc_rde_soh and (ii) data signal mdc_rde_data [31:0]. Read-FIFO buffers 3000 receive from ROSR 2701 of ROS 2104 Logical-Drive Identifier signal current_did[3:0]. Read-FIFO buffers 3000 provide signal rif_data[31:0] to BPR 2106 and signal rif_soh to ROS 2104. RIF 2105 performs RAC mapping from Logical-Drive Identifier to Physical-Drive Identifier upon demand by ROS 2104. Accordingly, PARROT DID Map 3001 receives the stripe's Parity-Rotation Index PARROT[2:0] and Logical-Drive Identifier current_did[3:0] from ROSR 2701 of ROS 2104, and PHYS DID Map 3002 receives the selected RAID-Array Cluster registers RAC[3:0] from RCFR 2702 of ROS 2104. Parity rotation is accomplished by simply using PARROT DID Map 3001 to map current_did[3:0] to the parity-rotated Logical-Drive Identifier (RAID5_DID) using PARROT[2:0]. PHYS DID Map 2602 handles mapping of the (RAID5_DID) parity-rotated logical disk array drive numbers to physical drive numbers (PDID), which is performed using the VAP stored in one of RAC Profile Registers 0-15 (rRACMAP0-rRACMAP15, discussed in further detail with respect to Tables 23 and 24 below) identified by RAC[3:0]. The drive identifier rde_mdc_pdid[2:0] is then supplied to MDC 705. State machine 3003 receives signals mdc_rde_rdid[2:0], mdc_rde_valid, and mdc_rde_soh from MDC 705 and executes a read-interface handshake with MDC 705 via the rde_mdc_ready signal and the mdc_rde_valid signal. The rde_mdc_ready signal is asserted when read-FIFO buffers 3000 have been emptied to indicate that RDE 701 is ready to receive headers and data from MDC 705 on data signal mdc_rde_data[31:0].

Figure 31:
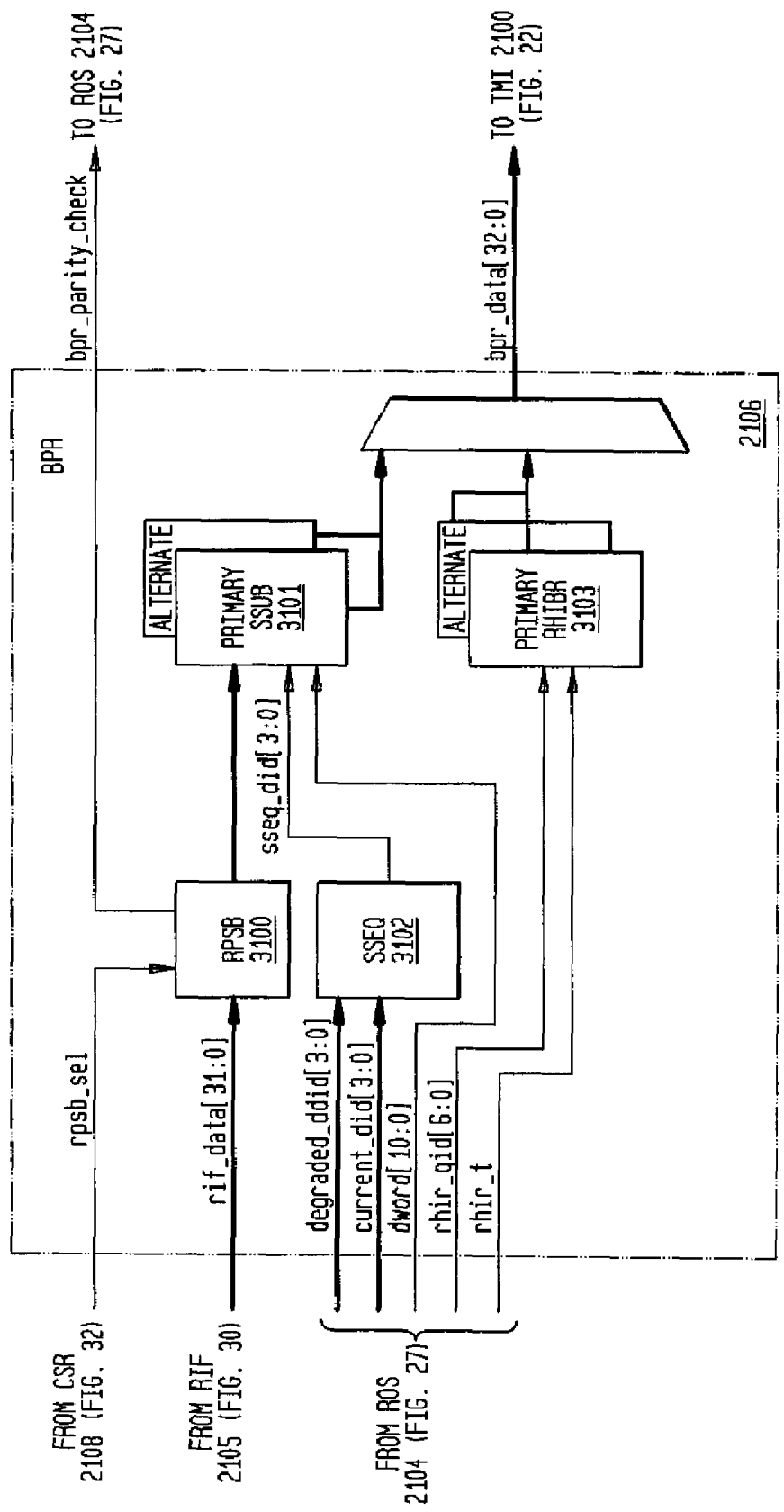
FIG. 31 is a block diagram of the Block-Parity Reconstructor (BPR) sub-block of the RAID Encoder/Decoder (RDE) of FIG. 21.

FIG. 31 illustrates Block-Parity Reconstructor (BPR) sub-block 2106 of RDE 701. BPR 2106 passes retrieved data to TMI 2100 and reconstructs data when operating in degraded mode. BPR 2106 includes Retrieval Parity-Sector Buffer (RPSB) 3100, Stripe Sector-Unit Buffer (SSUB) 3101, Sector Sequencer (SSEQ) 3102, and Response-Header Information-Buffer Register (RHIBR) 3103. BPR 2106 receives signal rpsb_sel, which indicates a degraded volume, from the degraded[6] bit of the operative VAP stored in one of RAC Profile Registers 0-15 (rRAC0-rRAC15, discussed in further detail with respect to Tables 21 and 22 below). BPR 2106 receives data signal rif_data[31:0] from RIF 2105. BPR 2106 receives header information from ROS 2104 via signals degraded_ddid[3:0], current_did[3:0], and dword[10:0]. BPR 2106 receives the T and QID fields from ROS 2104 via signals rhir_t and rhir_qid[6:0], respectively. BPR 2106 provides control signal bpr_parity_check to ROS 2104 and data signal bpr_data[32:0] to TMI 2100. The operation of BPR 2106 is directed by ROS 2104. SSUB 3101 (e.g., 2×1k×32-bit single-port RAMs) is a dual ping-pong buffer (or "double buffer"). A ping-pong buffer contains a pair of storage arrays (a "primary buffer" and an "alternate buffer"). Data received into a ping-pong buffer from a first bus is written into a first array, while data is read out of the second array and supplied to a second bus. The read and write functions of the two storage arrays are interchanged back and forth ("ping-ponged") from time to time, so that data is alternatingly written into the first array and then the second array, and data is alternatingly read out from the second array and then the first array, in an opposite manner from that used for the writing operation. Accordingly, SSUB 3101 contains a primary buffer and an alternate buffer, which are alternatingly used to build SSUs. Retrieved SSUs flow through RPSB 3100 (e.g., a 128×32-bit RAM with separate read and write ports) and become logically organized in SSUB 3101, to be stored into one of the two buffers of SSUB 3101, as selected through SSEQ 3102.

RPSB 3100 is similar to PSB 2500 of PBP 2102 because, as these retrieved sectors flow through RPSB 3100, XOR calculations are accumulated in RPSB 3100. Signal rpsb_sel controls multiplexer 2501, determining whether an SSU arriving at RPSB 3100 will (i) cause the SSU to pass through RPSB 3100 and be provided to SSUB 3101 normally (in non-degraded mode), or instead, (ii) cause RPSB 3100 to generate and output accumulated parity information to SSUB 3101 (in degraded mode).

In degraded mode, the reconstructed sector corresponding to the failed drive is loaded from the parity information accumulated in RPSB 3100. (In non-degraded mode, the contents of RPSB 3100 should be zero.) The parity information generated by RPSB 3100 is therefore a logical OR of the contents of RPSB 3100, i.e., a sequentially-accumulated logical OR of XOR results written to RPSB 3100. If this parity information is not zero, then error bit E is set in RHER 2706 of ROS 2104.

Either the primary buffer or the alternate buffer of SSUB 3101 is used to build an SSU. When the SSU is complete, SSUB 3101 is ping-ponged so that the other buffer of SSUB 3101 is selected to build the next SSU. As the next SSU is built, the previously-completed SSU is fed in logical order to response FIFO 2200 of TMI 2100.

RHIBR 3103 is a dual ping-pong buffer containing a primary buffer and an alternate buffer that are ping-ponged in tandem with the buffer of SSUB 3101, and RHIBR 3103 holds header information to be multiplexed with SSU data from the corresponding primary or alternate buffer of SSUB 3101. Accordingly, the header information received via signals rhir_t and rhir_qid[6:0] from register RIRR 2703 of ROS 2104, multiplexed with SSU data from SSUB 3101, is provided to response FIFO 2200 of TMI 2100 on 33-bit data signal bpr_data[32:0] and is only written into response FIFO 2200 of TMI 2100 at the beginning of a response frame, i.e., when the QID changes.

Figure 32:
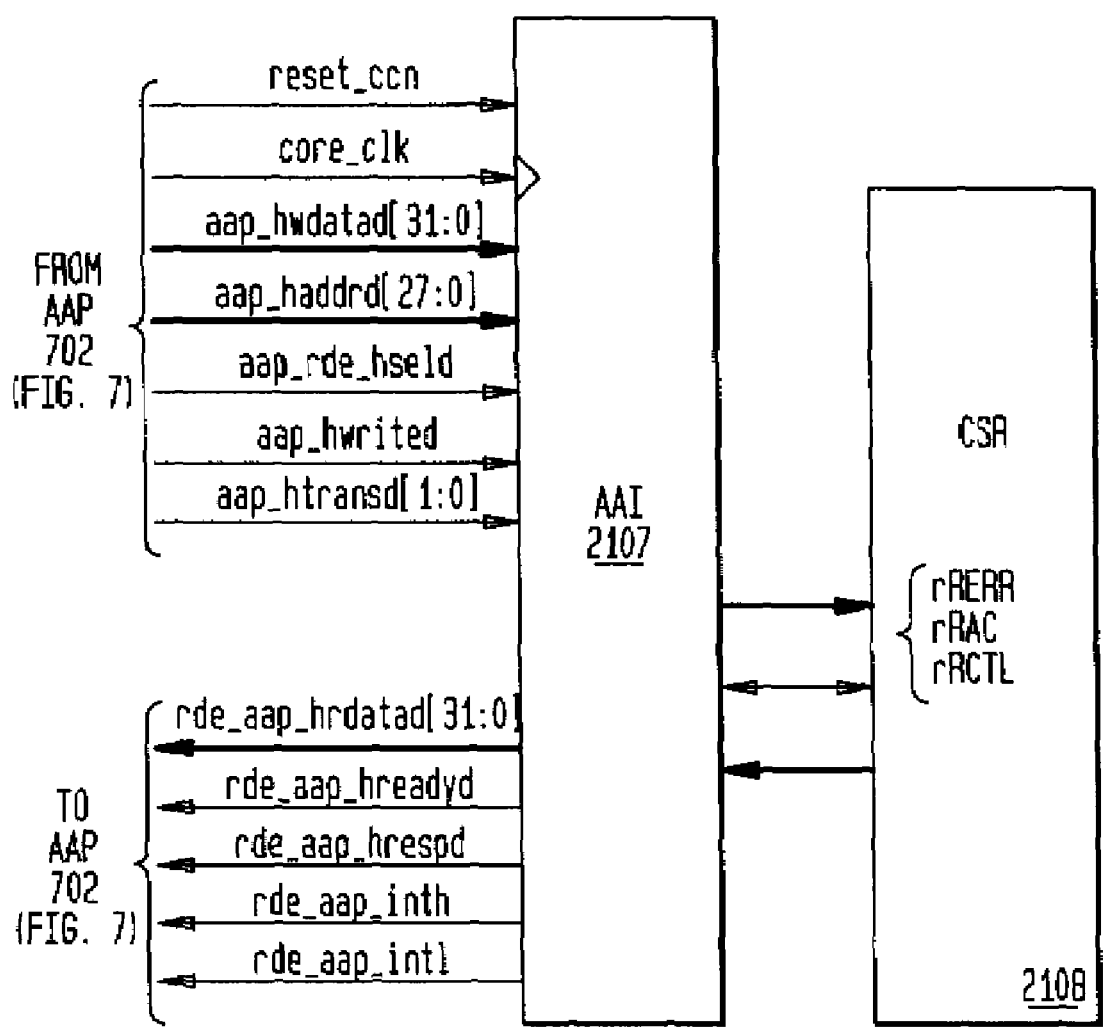
FIG. 32 is a block diagram of the Application-Processor Interface (AAI) and Control/Status Register (CSR) sub-blocks of the RAID Encoder/Decoder (RDE) of FIG. 21.

FIG. 32 is a block diagram of AAP-Interface (AAI) sub-block 2107 and Control/Status Registers (CSR) 2108 of RDE 701. As fully discussed above with reference to FIG. 10, AAI 2107 receives from AAP 702 signals core_clk, reset_ccn, aap_hwdatad[31:0], aap_haddrd[27:0], aap_rde_hseld, aap_hwrited, and aap_htransd[1:0] and provides to AAP 702 signals rde_aap_hrdatad[31:0], rde_aap_hreadyd, rde_aap_hrespd, rde_aap_inth, and rde_aap_intl. AAI 2107 exchanges data and control signals with CSR 2108, which stores memory-mapped processor-accessible registers and memories that are used by the various sub-blocks of RDE 701.

CSR Registers

CSR 2108 (e.g., a 32×32-bit memory) includes three categories of registers: (i) Error-Status Registers (rRERR), (ii) RAC-Profile Registers (rRAC), and (iii) an RDE-Control Register (rRCTL).

In the Error-Status Registers (rRERR), error-status bits are set to the asserted state by RDE 701 when errors are recognized. Each of registers rRERR has a corresponding high-priority interrupt-mask register and a corresponding low-priority interrupt-mask register. The high-priority interrupt request is asserted when any error-status bit and the corresponding high-priority interrupt mask bit are both asserted. Similarly, the low-priority interrupt request is asserted when any error-status bit and the corresponding low-priority interrupt mask bit are both asserted. In the event error-status bit E for a given drive has a value of 1, or if there is T mismatch (e.g., IRF 2700 contains T=0, but MDC 705 contains T=1) or a QID mismatch, both the rRERR registers and the appropriate rRAC registers will be updated, so that the drive with the error is marked as degraded. For a parity error detected in BPR 2106 after ROSM 2707 leaves the RPSU state, i.e., accumulated OR operations on the XOR bits result in a value of 1, the RQIDPE registers are updated, depending on the QID value, but no drives are marked as degraded, and no other registers are updated (assuming that the check bit is set in the operative RAC-profile register).

The following register map Table 1 shows the rERR registers that are bitmapped per DID register, for errors received from MDC 705 that occur during either actual or attempted read or write operations on disks 712 via MDC 705.

TABLE 1 rRERR-Response Errors Bitmapped per DID Register

| Register Name | Offset | Bit Position | Field | Class | Description |
|---|---|---|---|---|---|
| rRERR | 0xB0000010 | 31:24 | Reserved | R | Reserved. Always zero |
| | | 23:16 | MISME{7<DID<0} | R | mismatch Error bit mapped per 7 < PDID <0 (Expected response ≠ MDC Response) Defaults to zero. |

TABLE 1-continued rRERR-Response Errors Bitmapped per DID Register

| Register Name | Offset | Bit Position | Field | Class | Description |
|---|---|---|---|---|---|
| | | 15:8 | MDCRE{7<DID<0} | R | MDC Retrieval Error bit mapped per 7 < PDID <0 (MDC Response Error marked with T ==1) Defaults to zero. |
| | | 7:0 | MDCSE{7<DID<0} | R | MDC Storage Error bit mapped per 7 < PDID <0 (MDC Response Error marked with T ==0) Defaults to zero. |

The following register map Tables 2-5 show the rRERR registers that store bits indicating retrieval-response errors, bitmapped per QID.

TABLE 2 rQIDPE3 Queue-Identified Parity-Error Bitmapped Register 3

| Register Name | Offset | Bit Position | Field | Class | Description |
|---|---|---|---|---|---|
| rQIDPE3 | 0xB0000020 | 31:0 | PE{127<QID<96} | R | Parity Error bit mapped per 127 < QID <96 Defaults to zero. |

TABLE 3 rQIDPE2 Queue-Identified Parity-Error Bitmapped Register 2

| Register Name | Offset | Bit Position | Field | Class | Description |
|---|---|---|---|---|---|
| rQIDPE2 | 0xB0000028 | 31:0 | PE{95<QID<64} | R | Parity Error bit mapped per 95 < QID <64 Defaults to zero. |

TABLE 4 rQIDPE1 Queue-Identified Parity-Error Bitmapped Register 1

| Register Name | Offset | Bit Position | Field | Class | Description |
|---|---|---|---|---|---|
| rQIDPE1 | 0xB0000030 | 31:0 | PE{63<QID<32} | R | Parity Error bit mapped per 63 < QID <32 Defaults to zero. |

TABLE 5 rQIDPE0 Queue-Identified Parity-Error Bitmapped Register 0

| Register Name | Offset | Bit Postion | Field | Class | Description |
|---|---|---|---|---|---|
| rQIDPE0 | 0xB0000038 | 31:0 | PE{31<QID<0} | R | Parity Error bit mapped per 31 < QID <0 Defaults to zero. |

The following register map Tables 6-10 show the rRERR high-priority interrupt-mask registers. When the bits of these registers are set to 1, high-priority interrupt requests are generated when the corresponding bits in the rRERR register are set.

TABLE 6 rRERR-Response Errors Bitmapped per
DID High-Priority Interrupt-Mask Register

| Register Name | Offset | Bit Position | Field | Class | Description |
|---|---|---|---|---|---|
| rRERRH | 0xB0000040 | 31:24 | Reserved | RW | Reserved. Defaults to zero |
| | | 23:0 | HIM | RW | These bits are set to 1 to enable high priority interrupts to be generated when the corresponding bits in the rRERR register are set Defaults to zero. |

TABLE 7 rQIDPE3 Queue-Identified Parity-Error Bitmapped
High-Priority Interrupt-Mask Register 3

| Register Name | Offset | Bit Position | Field | Class | Description |
|---|---|---|---|---|---|
| rQIDPE3H | 0xB0000050 | 31:0 | HIM | RW | These bits are set to 1 to enable high priority interrupts to be generated when the corresponding bits in the rRQIDPE3 register are set Defaults to zero. |

TABLE 8 rQIDPE2 Queue-Identified Parity-Error Bitmapped
High-Priority Interrupt-Mask Register 2

| Register Name | Offset | Bit Position | Field | Class | Description |
|---|---|---|---|---|---|
| rQIDPE2H | 0xB0000058 | 31:0 | HIM | RW | These bits are set to 1 to enable high priority interrupts to be generated when the corresponding bits in the rRQIDPE2 register are set Defaults to zero. |

TABLE 9 rQIDPE1 Queue-Identified Parity-Error Bitmapped
High-Priority Interrupt-Mask Register 1

| Register Name | Offset | Bit Position | Field | Class | Description |
|---|---|---|---|---|---|
| rQIDPE1H | 0xB0000060 | 31:0 | HIM | RW | These bits are set to 1 to enable high priority interrupts to be generated when the corresponding bits in the rRQIDPE1 register are set Defaults to zero. |

TABLE 10 rQIDPE0 Queue-Identified Parity-Error Bitmapped
High-Priority Interrupt-Mask Register 0

| Register Name | Offset | Bit Position | Field | Class | Description |
|---|---|---|---|---|---|
| rQIDPE0H | 0xB0000068 | 31:0 | HIM | RW | These bits are set to 1 to enable high priority interrupts to be generated when the corresponding bits in the rRQIDPE0 register are set Defaults to zero. |

The following register map Tables 11-15 show the rRERR low-priority interrupt-mask registers. When the bits of these registers are set to 1, low-priority interrupt requests are generated when the corresponding bits in the rRERR register are set.

TABLE 11 rRERR-Response Errors Bitmapped per
DID Low-Priority Interrupt-Mask Register

| Register Name | Offset | Bit Position | Field | Class | Description |
|---|---|---|---|---|---|
| rRERRL | 0xB0000048 | 31:24 | Reserved | RW | Reserved. Defaults to zero |
| | | 23:0 | LIM | RW | These bits are set to 1 to enable low priority interrupts to be generated when the corresponding bits in the rRERR register are set Defaults to zero. |

TABLE 12 rQIDPE3 Queue-Identified Parity-Error Bitmapped
Low-Priority Interrupt-Mask Register 3

| Register Name | Offset | Bit Position | Field | Class | Description |
|---|---|---|---|---|---|
| rQIDPE3L | 0xB0000070 | 31:0 | LIM | RW | These bits are set to 1 to enable low priority interrupts to be generated when the corresponding bits in the rRQIDPE3 register are set Defaults to zero. |

TABLE 13 rQIDPE2 Queue-Identified Parity-Error Bitmapped
Low-Priority Interrupt-Mask Register 2

| Register Name | Offset | Bit Position | Field | Class | Description |
|---|---|---|---|---|---|
| rQIDPE2L | 0xB0000078 | 31:0 | LIM | RW | These bits are set to 1 to enable low priority interrupts to be generated when the corresponding bits in the rRQIDPE2 register are set Defaults to zero. |

TABLE 14 rQIDPE1 Queue-Identified Parity-Error Bitmapped
Low-Priority Interrupt-Mask Register 1

| Register Name | Offset | Bit Position | Field | Class | Description |
|---|---|---|---|---|---|
| rQIDPE1L | 0xB0000080 | 31:0 | LIM | RW | These bits are set to 1 to enable low priority interrupts to be generated when the corresponding bits in the rRQIDPE1 register are set Defaults to zero. |

TABLE 15

Queue-Identified Parity-Error Bitmapped
Low-Priority Interrupt-Mask Register 0

| Register Name | Offset | Bit Position | Field | Class | Description |
|---|---|---|---|---|---|
| rQIDPE0L | 0xB0000088 | 31:0 | LIM | RW | These bits are set to 1 to enable low priority interrupts to be generated when the corresponding bits in the rRQIDPE0 register are set Defaults to zero. |

Each of error-status registers rRERR has a corresponding clear register. The error-status bits are cleared (returned to the deasserted state) when the corresponding bits are asserted in a write operation to the clear register. When all of the masked error-status bits have been cleared, the corresponding interrupt request is deasserted. The following register map Tables 16-20 show the clear registers.

TABLE 16 rRQIDPE3 Queue-Identified Parity-Error Bitmapped Clear Register 3

| Register Name | Offset | Bit Position | Field | Class | Description |
|---|---|---|---|---|---|
| rQIDPE3C | 0xB0000090 | 31:0 | Clear | W | These bits are set to 1 to clear the corresponding bits in the rRQIDPE3 register Defaults to zero. |

TABLE 17 rQIDPE2 Queue-Identified Parity-Error Bitmapped Clear Register 2

| Register Name | Offset | Bit Position | Field | Class | Description |
|---|---|---|---|---|---|
| rQIDPE2C | 0xB0000098 | 31:0 | Clear | W | These bits are set to 1 to clear the corresponding bits in the rRQIDPE2 register Defaults to zero. |

TABLE 18 rRQIDPE1 Queue-Identified Parity-Error Bitmapped Clear Register 1

| Register Name | Offset | Bit Position | Field | Class | Description |
|---|---|---|---|---|---|
| rQIDPE1C | 0xB00000A0 | 31:0 | Clear | W | These bits are set to 1 to clear the corresponding bits in the rRQIDPE1 register Defaults to zero. |

TABLE 19 rQIDPE0 Queue-Identified Parity-Error Bitmapped Clear Register 0

| Register Name | Offset | Bit Position | Field | Class | Description |
|---|---|---|---|---|---|
| rQIDPE0C | 0xB00000A8 | 31:0 | Clear | W | These bits are set to 1 to clear the corresponding bits in the rRQIDPE0 register Defaults to zero. |

TABLE 20 rRERR-Response Errors Bitmapped per DID-Register Clear

| Register Name | Offset | Bit Position | Field | Class | Description |
|---|---|---|---|---|---|
| rRERRC | 0xB00000B0 | 31:24 | Reserved | NA | |
| | | 23:0 | Clear | W | These bits are set to 1 to clear the corresponding bits in the rRERR register Defaults to zero. |

In the unlikely event that, when an error-status bit is being cleared, a corresponding error event for the same error-status bit has been newly recognized on the same clock cycle, that bit should remain cleared. In other words, the software-mandated clearing operation directed to AAP 702 has a higher priority than the setting of the repeat event. Presumably, software has taken notice of the initial event. If, however, the newly-recognized event arrives at the error-status register one or more clock cycles before or after that error-status register is cleared, then there is no collision, and there is no obstructing refractory interval.

The RAC-Profile Registers (rRAC) store information about each of the VAPs, including chunk size (K), number of DSUs per stripe (K*(N−1)), whether parity-checking is enabled, logical number of a degraded drive (RAID_5_DID_ldeg), cluster degraded status, RAID level, cluster alternate profile. It is noted that, for each RAID-Array Cluster, a RAID level is stored in bits[5:4], which can be either RAID-5, RAID-4, RAID-0, or "Just a Bunch of Disks" (JBOD). Whereas a RAID system stores the same data redundantly on multiple physical disks that nevertheless appear to the operating system as a single disk, JBOD also makes the physical disks appear to be a single one, but accomplishes this by combining the drives into one larger logical drive. Accordingly, JBOD has no advantages over using separate disks independently and provides none of the fault tolerance or performance benefits of RAID. Nevertheless, JBOD may be useful for certain applications, and an RAC cluster can utilize a JBOD scheme instead of a RAID scheme, if a user so desires. The following register map Tables 21-24 show the RAC Profile registers.

TABLE 21 rRAC0 RAID-Array Cluster Register

| Register Name | Offset | Bit Position | Field | Class | Description |
|---|---|---|---|---|---|
| rRAC0 | 0xB0000100 | 31:23 | Chunk-size | RW | Number of sectors per chunk (K) Defaults to zero. |
| | | 22:12 | Stripe DSUs | RW | Number of Data Sectors per stripe K*(N − 1) Defaults to zero. |
| | | 11 | Reserved | RW | |
| | | 10 | Check | RW | Enable Parity Checking Defaults to zero. |
| | | 9:7 | Ldeg | RW | Logical Number (RAID5_DID) of the degraded drive Defaults to zero. |
| | | 6 | degraded | RW | this Cluster to be treated as degraded Defaults to zero. |
| | | 5:4 | RAID level | RW | 0 = RAID level 5 (left symmetric parity placement) 1 = RAID level 4 (parity without rotation) 2 = RAID level 0 (stripeing, no parity) 3 = JBOD Just a Bunch of Disks - cluster size must be one Defaults to zero. |
| | | 3:0 | Cluster-size | RW | (N) Number of drives configured for cluster Defaults to zero. | size, and physical-to-logical drive mappings. In the write path, the operative RAID-Array Cluster Profile is chosen as indexed by the request's RAC[3:0] field (as shown in FIG. 12). In the read path, the operative RAID-Array Cluster Profile is chosen as indexed by the response's RAC[3:0] field (as shown in FIG. 13). In the unlikely occurrence that an error-induced back-annotation event is recognized simultaneously with a processor-mandated update on an operative VAP, the software-mandated update directed by AAP 702 overrides the back-annotation, because the update is based on the "stale" profile. If, however, the newly-recognized event arrives at the profile register one or more clock cycles before or after the register is cleared, then there is no collision, and there is no obstructing refractory interval. Such collisions could be avoided by software restricting configuration updates to "spare" out-of-service profiles that will not be operative for outstanding requests, and then switching to the spare updated

TABLE 22 rRAC1-15 RAID-Array Cluster Registers 1-15

| Register Name | Offset | Bit Position | Field | Class | Description |
|---|---|---|---|---|---|
| rRAC1-15 | 0x80000100 + 8*RAC[3:0] | 31:0 | All | RW | same format as rRAC0. Defaults to zero. |

TABLE 23 rRACMAP0 Drive-Mapping Register for RAID-Array Cluster 0

| Register Name | Offset | Bit Position | Field | Class | Description |
|---|---|---|---|---|---|
| rRACMAP0 | 0xB0000180 | 31 | Reserved | NA | Reserved. Always zero |
| | | 30:28 | PD7 | RW | Physical Drive mapped to Logical Drive 7 Defaults to zero. |
| | | 27 | Reserved | NA | Reserved. Always zero |
| | | 26:24 | PD6 | RW | Physical Drive mapped to Logical Drive 6 Defaults to zero. |
| | | 23 | Reserved | NA | Reserved. Always zero |
| | | 22:20 | PD5 | RW | Physical Drive mapped to Logical Drive 5 Defaults to zero. |
| | | 19 | Reserved | NA | Reserved. Always zero |
| | | 18:16 | PD4 | RW | Physical Drive mapped to Logical Drive 4 Defaults to zero. |
| | | 15 | Reserved | NA | Reserved. Always zero |
| | | 14:12 | PD3 | RW | Physical Drive mapped to Logical Drive 3 Defaults to zero. |
| | | 11 | Reserved | NA | Reserved. Always zero |
| | | 10:8 | PD2 | RW | Physical Drive mapped to Logical Drive 2 Defaults to zero. |
| | | 7 | Reserved | NA | Reserved. Always zero |
| | | 6:4 | PD1 | RW | Physical Drive mapped to Logical Drive 1 Defaults to zero. |
| | | 3 | Reserved | NA | Reserved. Always zero |
| | | 2:0 | PD0 | RW | Physical Drive mapped to Logical Drive 0 Defaults to zero. |

TABLE 24 rRACMAP1-15 Drive-Mapping Registers for RAID-Array Clusters 1-15

| Register Name | Offset | Bit Position | Field | Class | Description |
|---|---|---|---|---|---|
| rRACMAP1-15 | 0xB0000180 + 8*RAC[3:0] | 31:0 | All | RW | same format as rRACMAP0. Defaults to zero |

The RDE-Control Register (rRCTL) controls enabling of the interfaces between RDE 701 (as shown in FIG. 10) and the various other blocks of system 700, as well as the zeroing of the various FIFOs and associated pipelines in RDE 701. If the Enable TMA-RDE Interface (ETMARDE) bit is set, then the TMA-RDE interface is enabled and, if not set, then signal rde_tma_ready will not be asserted. If the Enable RDE-TMA Interface (ERDETMA) bit is set, then the RDE-TMA interface is enabled and, if not set, then signal tma_rde_ready will be perceived to be deasserted, and signal rde_tma_valid will not be asserted. If the Enable MDC-RDE Interface (EMDCRDE) bit is set, then the MDC-RDE interface is enabled and, if not set, then signal rde_mdc_ready will not be asserted. If the Enable RDE-MDC Interface (ERDEMDC) bit is set, then the RDE-MDC interface is enabled and, if not set, then signal mdc_rde_ready[7:0] will be perceived to be deasserted, and signal rde_mdc_valid will not be asserted. If the Zero-Response Pipeline (ZRSP) bit is set, then the entire response pipeline of RDE 701, including response FIFO 2200 of TMI 2100, and Read-Operation State Machine (ROSM) 2707 of ROS 2104 is cleared. If the Zero-Issued Request FIFO (ZIRF) bit is set, then issued-request FIFO (IRF) 2700 of ROS 2104 is cleared. If the Zero-Request Pipeline (ZREQ) bit is set, then the entire request pipeline of RDE 701, including FIFO (WPF) 2603 of WIF 2103, and Write-Operation State Machine (WOSM) of WOS 2101 is cleared. The following register map Table 25 shows the RDE Control Register.

TABLE 25 rRCTL RDE-Control Register

| Register Name | Address | Bit Position | Field | Class | Description |
|---|---|---|---|---|---|
| rRCTL | 0xB0000000 | 31:7 | Reserved | RW | Reserved. Defaults to zero |
| | | 6 | ZREQ | RW | Zero Request Pipeline Defaults to zero. |
| | | 5 | ZIRF | RW | Zero Issued Request FIFO Defaults to zero. |
| | | 4 | ZRSP | RW | Zero Response Pipeline. Defaults to zero. |
| | | 3 | ERDEMDC | RW | Enable RDE-MDC interface. Defaults to zero. |
| | | 2 | EMDCRDE | RW | Enable MDC-RDE interface. Defaults to zero. |
| | | 1 | ERDETMA | RW | Enable RDE-TMA interface. Defaults to zero. |
| | | 0 | ETMARDE | RW | Enable TMA-RDE interface. Defaults to zero. |

RDE Storage Operation

The sequence of RDE 701 sending sectors to MDC 705 for write operations proceeds by stripe from drive to drive in round-robin manner, as discussed above with respect to FIG. 9. As a first example, the sequence of writing to the disk drives of a six-drive array (N=6), wherein the transfer count is 4 (XCNT=4) and the sector sequence of 0-1-2-3-4-P-5-6-7-8-9-P-10-11-12-13-14-P-15-16-17-18-19-P, would be written as follows. Logical disk 0 is sent a header with an XCNT of 4, followed by sectors 0, 5, 10, and 15. Thus, a header indicating XCNT=4 is written to drive 0. A header with XCNT=4 is written to drive 1. A header with XCNT=4 is written to drive 2. A header with XCNT=4 is written to drive 3. A 20 header with XCNT=4 is written to drive 4. A header with XCNT=4 is written to drive 5. Sector 0 is written to drive 0. Sector I is written to drive 1. Sector 2 is written to drive 2. Sector 3 is written to drive 3. Sector 4 is written to drive 4. Sector P is written to drive 5. Sector 5 is written to drive 0. Sector 6 is written to drive 1. Sector 7 is written to drive 2. Sector 8 is written to drive 3. Sector 9 written to drive 4. Sector P is written to drive 5. Sector 10 is written to drive 0, and so forth. Thus, RDE 701 does not rearrange data that it receives from TMA 707 but merely provides it to the drives sector by sector, each sector being written to a successive drive.

A second exemplary storage operation of RDE 701 will now be described, wherein the requested volume is degraded. The parameters of this storage operation are as follows. WHER 2301 contains the following header information (as shown in FIG. 14 and FIG. 15): T=0 (indicating a storage request), RAC=0 (profile number 0), QID=2, LENGTH=22, and starting_DSA=28. Register rRAC contains the following VAP information: K=4 (chunk size), K*(N−1)=16 (number of data sectors per stripe), N=5 (array has 5 drives), degraded=1 (degraded is TRUE), and RAID5_DID_ldeg=3 (logical number of degraded drive). WCFR 2305 contains the following information: starting_STRIPE=1, starting_SSU_DSU_OFFSET=0, starting_STRIPE_DSU_OFFSET=12, starting_STRIPE_SSU_OFFSET=12, and starting_SSU_OF_STRIPE=3. WOSR 2302 contains the following information: starting_PARROT=1. WHIR 2304 contains the following header information: XCNT=6, and starting_LBA=7.

(1) Header information from WHIR 2304 is provided to WPF 2603 from WHIBR 2600 for each DID (RAID4_DID). As the header information is being provided to WPF 2603, PARROT maps the RAID4_DID to RAID5_DID. When DID==4 (i.e., N−1), PARROT DID Map 2601 of WIF 2103 maps to the PSU's RAID5_DID, which matches RAID5_DID_ldeg==3, causing the information in WHIBR 2600 to be blanked. Mapping from RAID5_DID to PDID is also done by PHYS DID Map 2602 of WIF 2103 using the per-DID entries for RAC==0 in the operative VAP stored in RAC Profile Register 0 (rRACMAP0, discussed above with respect to Table 23).

(2) DSUs 28 through 31 flow through PBP 2102 to WPF 2603 of WIF 2103. PSU P7 is blanked because its RAID5_DID matches the RAID5_DID_ldeg==3, and so PSU P7 never enters WPF 2603.

(3) As DID wraps back around to zero, the per-SSU registers of WOSR 2302 are incremented. However, in this case, the current SSU_OF_STRIPE reaches chunk size K and also wraps around. As the stripe boundary is crossed, the current STRIPE and PARROT are incremented.

(4) DSUs 32 through 35 flow through PBP 2102 to WPF 2603 of WIF 2103. DSU 34 is blanked because its RAID5_DID matches the RAID5_DID_ldeg==3, and so DSU 34 never enters WPF 2603. This time, however, PSU P8 does enter WPF 2603, because the current_parrot was incremented, and when its PSU RAID4_DID (which always equals (N−1)), is mapped through PARROT DID Map 2601 of WIF 2103, its RAID5_DID==2.

(5) Similarly, DSUs 36 through 49 and PSUs P9 through P11 either flow through PBP 2102 to WPF 2603 of WIF 2103 or are blanked.

(6) At DSU 50, the DSU_count matches the LENGTH, and therefore, no more data is to be stored for QID==2 from TMI 2100, and so zero-padding ensues. Zeroes generated by PBP 2102 are passed through PSB 2500. When DID==N−1, P12 is provided to WPF 2603 of WIF 2103. It is noted that the zero-padding-generated DSU 50 is blanked.

(7) ROS 2104 retrieves the entry from IRF 2700, performs the calculations in translator 2704, and updates the RIRR 2703, ROSR 2701, and RCFR 2702 registers. The response headers are read from MDC 705 and verified for each of the non-degraded drives in the RAID cluster. When header checking is complete, the buffers of SSUB 3101 and RHIBR 3103 are ping-ponged, and the appropriate error-status bit is updated in the rRERR registers.

RDE Retrieval Operation

The sequence of operations in a first exemplary retrieval operation, where N=6, proceeds as follows.

(1) TMA 707 sends to RDE 701 a storage-request frame (as shown in FIG. 12) that provides QID, RAC, starting_DSA, and LENGTH.

(2) WOS 2101 receives QID, RAC, starting_DSA, and LENGTH and calculates a header to be generated and written to each drive. This header includes the LBA and XCNT. In this example, the same header will be sent six times, i.e., there will be six identical headers for six disks.

(3) The six headers are written to WPF 2603 of WIF 2103.

(4) WIF 2103 sends these six headers from WPF 2603 to MDC 705 in the data control/transfer format shown in FIG. 16, and with the timing shown in FIG. 15.

(5) MDC 705 then retrieves data from the six disks, according to the information in the six headers that it received from RDE 701, and stores the data into its six different FIFOs.

(6) The response data in the FIFOs of MDC 705 is transferred to RDE 701 in the data control/transfer format shown in FIG. 19, and with the timing shown in FIG. 18.

(7) Error status is updated in the rRERR registers.

A second exemplary retrieval operation of RDE 701 will now be described, wherein the requested volume is degraded. The parameters of this storage operation are as follows. WHER 2301 contains the following header information (as shown in FIG. 14 and FIG. 15): T=1 (indicating a retrieval request), RAC=0 (profile number 0), QID=3, LENGTH=12, and starting_DSA=53. Register rRAC contains the following VAP information: K=4 (chunk size), K*(N−1)=16 (number of data sectors per stripe), N=5 (array has 5 drives), degraded=1 (degraded is TRUE), and RAID5_DID_ldeg=3 (logical number of degraded drive). WCFR 2305 contains the following information: starting_STRIPE=3, starting_SSU_DSU_OFFSET=1, starting_STRIPE_DSU_OFFSET=5, starting_STRIPE_SSU_OFFSET=4, and starting_SSU_OF_STRIPE=1. WOSR 2302 contains the following information: starting_PARROT=3. WHIR 2304 contains the following header information: XCNT=4, and starting_LBA=13.

(1) Header information from WHIR 2304 is provided to WPF 2603 from WHIBR 2600 for each DID (RAID4_DID). As the header information is being provided to WPF 2603, PARROT maps the RAID4_DID to RAID5_DID. When DID==2, PARROT DID Map 2601 of WIF 2103 maps to the RAID5_DID, which matches RAID5_DID_ldeg==3, causing the information in WHIBR 2600 to be blanked. Mapping from RAID5_DID to PDID is also done by PHYS DID Map 2602 of WIF 2103 using the per-DID entries for RAC==0 in the operative VAP stored in RAC Profile Register 0 (rRACMAP0, discussed above with respect to Table 23).

(2) ROS 2104 retrieves the entry from IRF 2700, performs the calculations in translator 2704, and updates the RIRR 2703, ROSR 2701, and RCFR 2702 registers. The response headers are read from MDC 705 and verified for each of the non-degraded drives in the RAID cluster. When header checking is complete, the buffers of SSUB 3101 and RHIBR 3103 are ping-ponged, and the appropriate error-status bit is updated in the rRERR registers.

(3) Because this is a retrieval response, a response header is entered into response FIFO 2200 of TMI 2100.

(4) SSU 13 (which contains DSU 52, P13, DSU 53, and DSU 55) is retrieved from MDC 705, with the exception of DSU 54, whose RAID4_DID==2 maps to a RAID5_DID which matches the RAID5_DID_ldeg==3. Therefore, DSU 54 is reconstructed by BPR 2106.

(5) After another ping-pong of the buffers of SSUB 3101 and RHIBR 3103, DSU52 is not written into the TRF because the starting_SSU_DSU_OFFSET==1. Therefore, DSU 53, reconstructed DSU 54, and DSU 55 are written into response FIFO 2200 of TMI 2100.

(6) Similarly, SSUs 14, 15, and 16 are retrieved from MDC 705 with DSU 58, DSU 62, and DSU 66 reconstructed by BPR 2106, while DSU 56 through DSU 64 are written into response FIFO 2200 of TMI 2100

(7) DSU 65 through DSU 67 are not written into response FIFO 2200 of TMI 2100 because the current DSU count exceeds the LENGTH plus the drive's SSU_DSU_OFFSET, i.e., the request was for twelve DSUs, twelve DSUs have now been provided.

Practical RDE Applications

The use of RDE 701, consistent with certain embodiments of the invention, enables a number of features and applications not possible with traditional RAID implementations, such as the following.

As discussed above, the RAC-Profile Registers (rRAC) store information describing each RAID-Array Cluster and enable the implementation of multiple virtual-array clusters with multiple VAPs. Traditional RAID arrays do not employ such RAC Profile Registers, but instead use either (i) fixed-hardware implementations that permit a group of drives to appear as one or (ii) software implementations that use the host computer's CPU to perform RAID operations. Disadvantageously, such traditional hardware implementations are inflexible, and such software implementations use processor and memory overhead. Moreover, neither permits a single set of physical drives to be used in more than one configuration at a time.

According to embodiments of the present invention, two different virtual-array clusters can be defined for a single set of physical disks and can be used concurrently for different operations. For example, a first virtual-array cluster could be streaming multimedia data to a software viewer running on computer 714, while a second virtual-array cluster is downloading data from another source. (This is enabled by the ping-pong state machine of ROSM 2707, which permits concurrent use of two different RAID-Array Clusters by "ping-ponging" the buffers of SSUB 3101 and RHIBR 3103, discussed in further detail below.) Moreover, during a retrieval request, only two clock cycles are required for each 32-bit frame (of two 32-bit quad bytes each) to be read from disks 712. A first QID can be operating on a first VAP and a second QID on a second VAP, wherein operations for the first cluster can take place concurrently with operations from the second cluster. In fact, it is possible for the two operations to be taking place on the same media object by concurrently accessing two different VAPs on which the media object is addressable, e.g., downloading one portion of a multimedia object while viewing another portion of the same object.

Various media objects with different data-object file systems stored on different portions of the same physical disk array can coexist and be used concurrently. The use of virtual-array profiles permits this because each physical drive in the virtual array has its own physical-to-logical drive mapping (stored in registers rRACMAP0-rRACMAP15) and a user can therefore exploit the additional storage on the fourth drive by having two virtual-array clusters accessible concurrently, each with a different file system (e.g., one with Linux and the other with Microsoft Windows).

Remapping of logical-to-physical disk drive identifiers permits arbitrary placement of disk drives in a set of drive bays. This is possible because, unlike traditional RAID arrays that identify disk drives only as physical drives (i.e., slot 0, slot 1, slot 2), multiple virtual-array profiles can be used, and each profile can specify different logical-to-physical drive assignments and drive orders, e.g., one profile in which logical disk 0 corresponds to physical drives 1 and 2, and another profile in which logical disk 1 corresponds to physical drive 0. This feature would permit, e.g., a new disk drive containing an upgraded operating system or other bootable partition to be added to an existing array employing a first virtual cluster, so that a computer could be booted up from the new disk drive under a second, JBOD virtual cluster, and the new disk drive could then be used concurrently with the existing virtual cluster.

In traditional RAID arrays, drives can be added to a RAID array only when they are physically present in the array, and when drives are removed from the array, no configuration information for these drives are stored. The use of virtual-array profiles permits adding or dropping a drive from a virtual-array cluster, independent of whether or not the drive is physically present in the array at the time the virtual-array profile is configured.

Virtual-array profiles also permit drive partitioning and block/chunk-sizing to be adjusted and resized on an ad-hoc basis, simply by changing or removing one or more existing virtual-array profiles or adding one or more new virtual-array profiles containing the desired sizing and partitioning.

Excess capacity on disk drives in a physical disk drive array can be used when integrating physical drives of varying sizes into virtual arrays, rather than all drives in the array being limited to using only the amount of storage available on the smallest-sized drive in the array. For example, in a traditional RAID array containing three 40 GB drives, if a fourth drive of 120 GB drive is added, only 40 GB of the fourth drive can be used. The use of virtual-array profiles solves this problem, because each physical drive in the virtual array has its own physical-to-logical drive mapping (stored in registers rRAC-MAP0-rRACMAP15) and a user can therefore exploit the additional storage on the fourth drive by having two virtual-array clusters accessible concurrently: one RAID-S virtual-array cluster for the 40 GB of the first three disks and the first 40 GB of the fourth disk, and one virtual-array cluster using a JBOD storage scheme to access the remaining 80 GB on the fourth disk. Thus, a user has the option of booting or updating from just a single disk drive in an array using a virtual array in a JBOD configuration, rather than always having to use all of the drives in the array, as required by traditional RAID arrays. Alternatively, the user could partition storage between profiles so that the first virtual-array cluster uses 35 GB of all four disks in a RAID-4 configuration, and the second virtual-array cluster uses 5 GB of the first three disks and 85 GB of the fourth disk in a JBOD storage scheme, and so forth.

In traditional RAID arrays, a disk controller communicates directly with physical disks in the array. Virtual-array profiles, in conjunction with the various blocks of RDE 701 that employ buffering (and with FIFO buffers of MDC 705), permit a disk controller (e.g., MDC 705) to communicate to the array's physical disks via these RDE blocks, which contain memory and cache. Thus, when requests are made to a controller to store data, the data can be loaded into cache memory to enhance write performance by reducing or eliminating delay while waiting for the physical disk to be ready for the write operation. Moreover, using virtual-array clusters can interleave reads and writes for optimal performance under a given drive-controller caching policy.

Virtual-array clusters can coexist with different feature selections on the same physical set of drives, such as striping, mirroring, dedicated parity, distributed parity, using just one disk drive, variable chunk sizing, degraded and non-degraded disk volumes, degraded drive physical designation, and/or variable cluster size.

Whereas, in traditional RAID arrays, an entire RAID array is unavailable for reading and writing while a volume is being reconstructed, virtual-array clusters permit reconstruction of a degraded virtual array as a background process, while concurrently using a different virtual array for reading and writing, without having to take all of the drives of the array offline.

In traditional RAID arrays, during read and write operations, one entire stripe is buffered at a time and stored so that parity calculations can be made, thereby requiring substantial processor and memory resources for this cumbersome storage and calculation process. However, in certain embodiments of the present invention, as described above, parity is calculated on-the-fly and accumulated in BPR 2106 and PBP 2102, thereby requiring storage for only one DSU at a time in each of these sub-blocks.

In traditional RAID arrays, when performing write operations, one sector of data at a time is sent to various physical disks in the array, and such transfer of data is typically performed by software running on the host computer, which calculates and provides addresses on these physical disks at which the data will be written. On the other hand, in certain embodiments of the present invention, all of these calculations are made quickly in hardware by RDE 701, thereby eliminating the need to use memory and processor resources of the host computer. Moreover, by sending one SSU at a time to MDC 705, all of the FIFO buffers of MDC 705 that correspond to physical disks installed in an array are addressed concurrently, thereby reducing or eliminating the need for substantial buffering within the storage devices of the array, as well.

Dynamic Back-Annotation

As described above, if a retrieval-response error condition (stored in register E of RHER 2706) is detected, then it is marked in the Error-Status Registers (rRERR), and if a VAP stored in one of RAC Profile Registers 0-15 (rRAC0-rRAC15) indicates that MDC 705 has detected an error due to a degraded volume, then ROS 2104 "back-annotates" the operative RAID-Array Register profile (specified by wcfr_rac[3:0]) with the RAID5_DID corresponding to the degraded drive, the degraded[6] bit in register RCFR 2702 is set to indicate a degraded drive, and the check bit of the degraded register in the corresponding VAP stored in rRAC0-rRAC15 is cleared. Such back-annotation permits missing or corrupt data stored on degraded portions of a drive to be reconstructed on-the-fly, without requiring user intervention or taking the entire array offline. For example, if one of drives 712 fails while a user is playing back a media object stored on drives 712, then RDE 701 modifies the corresponding VAP as degraded and begins operating in degraded mode, with minimal interruption of the media-object playback to the user.

As discussed above, the situation in which a request is made using a second VAP to write to a drive that has been back-annotated using a first VAP is handled by recording the DID of the degraded drive in rRERR. Thus, if MDC 705 receives the request using the second VAP, then MDC 705 is configured to dump the request. If the second VAP is used to make a read request to the degraded drive, then RDE 701 back-annotates the second VAP profile, as well. Thus, three different types of back-annotation are possible in certain embodiments of the invention: (i) the marking and back-annotation of a single VAP (the operative VAP), (ii) propagation of the error across multiple profiles, and (iii) dump performed by MDC 705. For this reason, if a request is made using a VAP, regardless whether the request is a read or write request, then the request is forwarded to both IRF 2700 and MDC 705, to prevent possible lockup of RDE 701.

Where FIFO buffers are used in the embodiments described herein, it should be understood that full and empty status of these buffers is taken into account, and that appropriate back-pressure is employed to prevent buffer over- and under-runs, even where such functionality is not specifically described above.

In the embodiments described herein, for storage, TMA 707 provides only DSAs that are on stripe boundaries. Thus, if the transfer length is such that the storage operation does not complete on an SSU boundary, then the SSU is filled out with zero-padding. It should be understood, however, that in other embodiments of the invention, DSAs might not be provided on stripe boundaries, in which case a scheme employing read-modify-write operations might be used, whereby an entire stripe sector would be read, then replacement data would be stored in the same location, and then parity information would be calculated based on the modified data.

In the embodiments described herein, retrieval does not necessarily begin and end on stripe boundaries, because it is expected that software will sometimes request portions of objects, rather than entire objects. Thus, TMA 707 may request DSAs for sectors that are not on SSU boundaries. However, for degraded or parity-checking modes, the entire starting SSU is read for reconstruction or checking. Similarly, certain transfer lengths may result in requests not ending on SSU boundaries or stripe boundaries. It is contemplated, therefore, that RDE 701 desirably provides TMA 707 only with precisely the data that was requested, even if more data is available.

While the embodiments set forth herein are described as having utility with RAID-4 and RAID-5 arrays, it is contemplated that support for other RAID levels is possible. For example, RAID-1 (mirroring), could be added for storage by simply writing the same data to multiple drives. In this scenario, retrieval would be implemented by specifying alternate VAPs. In fact, for storage with a RAID-Array Cluster of only two drives (N==2), RAID-4 or RAID-5 storage actually writes the same information as RAID-1, because the PSU matches the DSU in an SSU with only one DSU.

It should be understood that, although the embodiments described herein describe the use of two virtual-array clusters concurrently, more than two virtual-array clusters could alternatively be used concurrently in other embodiments of the invention.

The term "access," as used herein with respect to logical or physical storage devices, refers to one or more of a read operation, a write operation, an erase operation, and a data reconstruction operation on the storage device.

The broad term "storage configuration," as used herein, should be understood to include RAID-0, RAID-1, RAID-10, RAID-0+1, RAID-4, and RAID-5 storage configurations, as well as JBOD, "Just One Disk Drive" (JODD), and other possible storage configurations involving one or more storage devices in an array.

The term "resolution," as used herein, refers to the number of sectors that are processed in a single storage operation. For example, a resolution of a single sector level means that information and parity stored on all of the disks in a current sector level of an array are processed (e.g., XOR-combined) before information and parity stored on a subsequent sector level are processed.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

In a preferred embodiment of the present invention, all of the internal RDE processing is performed without using AAP 702 or any other processor, and the state machines and parity calculation and generation functionality are all implemented using logic gates.

We claim:

1. Apparatus for reading from a physical storage-device array comprising a plurality of storage devices, wherein:
    the physical storage-device array has a plurality of sector levels, each sector level containing one sector on each storage device in the array at corresponding addresses on across the storage devices; and
    the apparatus comprises:
        a memory adapted to store two or more profiles, each profile defining (i) a virtual array associated with a selected set of the storage devices and (ii) one or more parameters used for accessing information from the virtual array;
        a buffer (i) having a first portion and a second portion and (ii) coupled to receive data from the storage devices; and
        a state machine (i) coupled to the buffer and the memory and (ii) adapted to generate two or more successive pairs of instructions, wherein:
            the first instruction of each pair of instructions (i) is based on one or more parameters of a first profile and (ii) is an instruction to read, into the first portion of the buffer, one sector of data from each storage device of a first virtual array; and
            the second instruction of each pair of instructions (i) is based on one or more parameters of a second profile and (ii) is an instruction to read, into the second portion of the buffer, one sector of data from each storage device of a second virtual array.

2. The apparatus of claim 1, wherein:
    in the first instruction, data from each sector of each storage device of the first virtual array is read at a first sector level; and
    in the second instruction, data from each sector of each storage device of the second virtual array is read at a second sector level.

3. The apparatus of claim 2, wherein, for successive pairs of instructions, the first and second instructions are repeated at respective successive sector levels of the first and second virtual arrays.

4. The apparatus of claim 1, wherein the first and second profiles are associated with the same set of one or more storage devices.

5. The apparatus of claim 4, wherein the first and second instructions are for reading from the same physical storage devices.

6. The apparatus of claim 5, wherein the first and second instructions are for reading from the same object.

7. The apparatus of claim 1, wherein:
    one of the storage devices is a degraded storage device; and
    the first portion of the buffer is used for reconstructing information previously stored on the degraded storage device.

8. The apparatus of claim 7, wherein the second portion of the buffer is used for streaming a media object containing at least one of audio and video data.

9. The apparatus of claim 1, wherein the one or parameters indicate one or more of: the amount of data read from or written to the storage devices at a time, whether chunks of parity data are generated for the virtual array, the presence of a degraded storage device, a storage configuration, a RAID level, and a number of storage devices in the set.

10. The apparatus of claim 1, wherein the buffer is a ping-pong buffer.

11. The apparatus of claim 1, wherein:
in a first mode, data is received and written into the first portion of the buffer while data is read out of the second portion of the buffer; and
in a second mode, data is received and written into the second portion of the buffer while data is read out of the first portion of the buffer.

12. The apparatus of claim 11, wherein the buffer is adapted to receive a control signal to select between the first mode and the second mode.

13. The apparatus of claim 1, wherein the buffer supports concurrent access via an input port of one portion of the buffer and an output port of the other portion of the buffer.

14. The apparatus of claim 1, wherein the state machine is implemented using logic gates.

15. A method for reading from a physical storage-device array comprising a plurality of storage devices using a buffer having a first portion and a second portion, wherein:
the physical storage-device array has a plurality of sector levels, each sector level containing one sector on each storage device in the array at corresponding addresses across the storage devices, and the method comprises:
(a) accessing first and second profiles, each profile defining (i) a virtual array associated with a selected set of the storage devices and (ii) one or more parameters used for accessing information from the virtual array; and
(b) generating two or more successive pairs of instructions, wherein:
the first instruction of each pair of instructions (i) is based on one or more parameters of a first profile and (ii) is an instruction to read, into the first portion of the buffer, one sector of data from each storage device of a first virtual array; and
the second instruction of each pair of instructions (i) is based on one or more parameters of a second profile and (ii) is an instruction to read, into the second portion of the buffer, one sector of data from each storage device of a second virtual array.

16. The method of claim 15, wherein:
in the first instruction, data from each sector of each storage device of the first virtual array is read at a first sector level; and
in the second instruction, data from each sector of each storage device of the second virtual array is read at a second sector level.

17. The method of claim 16, wherein, for successive pairs of instructions, the first and second instructions are repeated at respective successive sector levels of the first and second virtual arrays.

18. The method of claim 15, wherein the first and second profiles are associated with the same set of one or more storage devices.

19. The method of claim 18, wherein the first and second instructions are for reading from the same physical storage devices.

20. The method of claim 19, wherein the first and second instructions are for reading from the same object.

21. The method of claim 15, wherein:
one of the storage devices is a degraded storage device; and
the first portion of the buffer is used for reconstructing information previously stored on the degraded storage device.

22. The method of claim 21, wherein the second portion of the buffer is used for streaming a media object containing at least one of audio and video data.

23. The method of claim 15, wherein the one or parameters indicate one or more of: the amount of data read from or written to the storage devices at a time, whether chunks of parity data are generated for the virtual array, the presence of a degraded storage device, a storage configuration, a RAID level, and a number of storage devices in the set.

24. The method of claim 15, wherein the buffer is a ping-pong buffer.

25. The method of claim 15, wherein:
in a first mode, data is received and written into the first portion of the buffer while data is read out of the second portion of the buffer; and
in a second mode, data is received and written into the second portion of the buffer while data is read out of the first portion of the buffer.

26. The method of claim 25, wherein the buffer is adapted to receive a control signal to select between the first mode and the second mode.

27. The method of claim 15, wherein the buffer supports concurrent access via an input port of one portion of the buffer and an output port of the other portion of the buffer.

28. The method of claim 15, wherein the first and second instructions of each pair are generated using a state machine.

29. The method of claim 28, wherein the state machine is implemented using logic gates.

* * * * *

UNITED STATES PATENT AND TRADEMARK OFFICE
CERTIFICATE OF CORRECTION

PATENT NO. : 7,653,783 B2  Page 1 of 1
APPLICATION NO. : 11/544456
DATED : January 26, 2010
INVENTOR(S) : Richard J. Byrne, Eu Gene Goh and Silvester Tjandra It is certified that error appears in the above-identified patent and that said Letters Patent is hereby corrected as shown below:

Title Page, (*) Notice: Delete "259 days" and insert -- 371 days --.

Title Page, Item (56) in references cited, please add "US 2006/0107002  05/2006  Benhase et al., 711  154".

Signed and Sealed this

Twenty-fourth Day of August, 2010

David J. Kappos
*Director of the United States Patent and Trademark Office*